US010111258B2

(12) United States Patent
Asterjadhi et al.

(10) Patent No.: US 10,111,258 B2
(45) Date of Patent: Oct. 23, 2018

(54) METHODS AND SYSTEMS FOR RECEIVER INITIATED PROTECTION OF A WIRELESS COMMUNICATION EXCHANGE

(71) Applicant: QUALCOMM Incorporated, San Diego, CA (US)

(72) Inventors: Alfred Asterjadhi, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 15/018,790

(22) Filed: Feb. 8, 2016

(65) Prior Publication Data

US 2016/0242070 A1 Aug. 18, 2016

Related U.S. Application Data

(60) Provisional application No. 62/116,293, filed on Feb. 13, 2015.

(51) Int. Cl.
*H04W 74/08* (2009.01)
*H04L 1/16* (2006.01)
(Continued)

(52) U.S. Cl.
CPC ......... *H04W 74/085* (2013.01); *H04L 1/1671* (2013.01); *H04L 1/1678* (2013.01);
(Continued)

(58) Field of Classification Search
CPC .......................... H04W 28/044; H04W 74/006
See application file for complete search history.

(56) References Cited

U.S. PATENT DOCUMENTS 9,661,649 B2 * 5/2017 Nanda .................... H04W 72/02
2005/0163150 A1 * 7/2005 Yang .................. H04W 74/0808
370/445
(Continued)

FOREIGN PATENT DOCUMENTS

WO WO 0215485 A1 * 2/2002 ............ H04W 74/06
WO WO-2005067217 A1 7/2005

OTHER PUBLICATIONS

International Search Report and Written Opinion—PCT/US2016/017149—ISA/EPO—dated Jun. 21, 2016.

*Primary Examiner* — Hassan Kizou
*Assistant Examiner* — Deepa Belur
(74) *Attorney, Agent, or Firm* — Knobbe, Martens, Olson & Bear LLP

(57) ABSTRACT

Systems, methods, and devices for wireless communication are disclosed. In some aspects, a method includes receiving from a transmitting device, via a receiving device, a first wireless frame, the first wireless frame forming at least a portion of a wireless communication exchange between the transmitting device and the receiving device, transmitting to the transmitting device, in response to the first wireless frame, a second wireless frame indicating that the receiving device will enable protection for a remaining portion of the wireless communication exchange, transmitting during a contention period, in response to the indication, a frame reserving the wireless medium for a time period; and receiving, via the receiving device, the remaining portion of the wireless communication exchange from the transmitting device during the time period.

28 Claims, 13 Drawing Sheets

(51) Int. Cl.
*H04L 1/18* (2006.01)
*H04L 5/00* (2006.01)
*H04L 12/911* (2013.01)
*H04W 72/04* (2009.01)
*H04W 74/00* (2009.01)
*H04W 28/26* (2009.01)

(52) U.S. Cl.
CPC .......... *H04L 1/1864* (2013.01); *H04L 1/1887* (2013.01); *H04L 5/0055* (2013.01); *H04L 47/826* (2013.01); *H04W 72/0446* (2013.01); *H04W 74/006* (2013.01); *H04W 28/26* (2013.01); *H04W 74/08* (2013.01)

(56) References Cited

U.S. PATENT DOCUMENTS

| | | | | |
|---|---|---|---|---|
| 2006/0072488 | A1* | 4/2006 | Meier | H04L 12/1886 370/312 |
| 2007/0076675 | A1 | 4/2007 | Chen | |
| 2007/0147284 | A1* | 6/2007 | Sammour | H04J 3/0605 370/328 |
| 2010/0220678 | A1 | 9/2010 | Wentink | |
| 2011/0064065 | A1 | 3/2011 | Nakajima et al. | |
| 2011/0087944 | A1* | 4/2011 | Li | H04L 1/0015 714/748 |
| 2013/0058222 | A1* | 3/2013 | Ben-Yehezkel | H04L 12/413 370/242 |
| 2013/0301569 | A1* | 11/2013 | Wang | H04L 5/0055 370/329 |
| 2014/0369227 | A1* | 12/2014 | Salonidis | H04L 43/0829 370/252 |
| 2014/0376453 | A1* | 12/2014 | Smith | H04W 74/0816 370/328 |
| 2016/0020885 | A1* | 1/2016 | Li | H04L 1/1854 370/329 |
| 2016/0029389 | A1* | 1/2016 | Merlin | H04J 1/14 370/330 |
| 2017/0064708 | A1* | 3/2017 | Noh | H04W 74/0816 |
| 2017/0208648 | A1* | 7/2017 | Choi | H04W 84/12 |

* cited by examiner

METHODS AND SYSTEMS FOR RECEIVER INITIATED PROTECTION OF A WIRELESS COMMUNICATION EXCHANGE

CROSS REFERENCE TO RELATED APPLICATIONS

This application claims priority to U.S. Provisional Application No. 62/116,293, filed Feb. 13, 2015, and entitled "METHODS AND SYSTEMS FOR RECEIVER INITIATED PROTECTION OF A WIRELESS COMMUNICATION EXCHANGE." The disclosure of this prior application is considered part of this application, and is hereby incorporated by reference in its entirety.

FIELD OF THE INVENTION

The present application relates generally to wireless communications, and more specifically to systems, methods, and devices for protecting a wireless medium from collisions or for helping the transmitter to gain access to the medium during a wireless communication exchange between a transmitter and a receiver.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

A device on a wireless network may experience collisions, especially in dense network environments. In some cases, the frequency of collisions may prevent the device from communicating effectively on the wireless network. In certain other case the device may not be able to access the medium for long periods of time due to continuous access of hidden nodes. Thus, there is a need to improve the reliability of devices transmitting within dense network environments.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between first and second devices in a wireless network. In an embodiment, the first and second devices may be access points and stations (STAs) in the wireless network.

One aspect disclosed is a method of wireless communication on a wireless medium, the method comprising receiving, by a receiving device, a first wireless frame from a transmitting device during a contention period, the first wireless frame forming a portion of a wireless communication exchange between the transmitting device and the receiving device, transmitting during the contention period, a second wireless frame indicating a network allocation vector for the wireless medium should be set for a time period of a duration sufficient to protect a remaining portion of the wireless communication exchange from packet collisions, and receiving, via the receiving device, the remaining portion of the wireless communication exchange from the transmitting device during the time period.

In some aspects, the wireless communication exchange includes one or more wireless frames with a more data indication, and corresponding acknowledgments for the one or more wireless frames. In some aspects, the method also includes determining that the first wireless frame includes an error, wherein the transmitting of the second wireless frame is in response to the determining. In some aspects, the method includes transmitting to the transmitting device, in response to the first wireless frame, a third wireless frame indicating that the receiving device will protect the wireless medium for the remaining portion of the wireless communication exchange. In some aspects, the method includes decoding the first wireless frame to determine the transmitting device requests that the receiving device protect the wireless medium for the remaining portion of the wireless communication exchange; and transmitting the second wireless frame in response to the determination. In some aspects, the method includes generating the third wireless frame to indicate a time when the receiving device will protect the wireless medium. In some aspects, the method includes generating the third wireless frame to indicate one or more transmission parameters for the transmitting device. In some aspects, the one or more transmission parameters include one or more of a modulation and coding scheme, use of LDPC/BCC, a number of spatial streams, a transmission bandwidth, or channel information, or a channel allocation for the transmission of the remaining portion of the wireless communication exchange, etc.

Another aspect disclosed is an apparatus for wireless communication on a wireless medium. The apparatus includes a receiver configured to receive a first wireless frame from a transmitting device during a contention period, the first wireless frame forming at least a portion of a wireless communication exchange between the transmitting device and the apparatus; and a transmitter configured to transmit during the contention period, a second wireless frame indicating a network allocation vector for the wireless medium is set for a time period of a duration sufficient to protect a remaining portion of the wireless communication exchange from packet collisions; and completing the wireless communication exchange during the time period.

In some aspects of the apparatus, the wireless communication exchange includes one or more wireless frames with a more data indication, and corresponding acknowledgments for the one or more wireless frames. In some aspects, the apparatus also includes a processor configured to determine that the first wireless frame includes an error, wherein the transmitter is further configured to transmit the second wireless frame in response to the determining.

In some aspects, the apparatus also includes transmitting to the transmitting device, in response to the first wireless frame, a third wireless frame indicating that the apparatus will transmit the second wireless frame. In some aspects, the apparatus also includes a processor configured to decode the first wireless frame to determine the transmitting device requests that the apparatus set the network allocation vector for the time period for the duration sufficient to protect the remaining portion of the wireless communication exchange from packet collisions. In some aspects, the apparatus also includes a processor configured to generate the third wireless frame to indicate one or more transmission parameters for the transmitting device, wherein the one or more transmission parameters include one or more of a modulation and coding scheme, a transmission bandwidth, channel information, and a channel allocation.

In some aspects, the apparatus includes a processor configured to generate the third wireless frame as one of a block acknowledgment or a negative acknowledgment. In some aspects, the apparatus includes a processor configured to generate the third wireless frame to indicate a time when the apparatus will transmit the second wireless frame. In some aspects, the apparatus includes a processor configured to generate the third wireless frame to indicate one or more transmission parameters. In some aspects, the apparatus includes a processor configured to generate the third wireless frame to indicate a duration of time for which the network allocation vector will be set. In some aspects, the apparatus includes a processor configured to determine a time necessary to complete the wireless communication exchange, and generate the second wireless frame to protect the wireless medium for at least the time necessary. In some aspects of the apparatus, the transmitter is further configured to transmit the second wireless frame protecting the wireless medium as a clear-to-send frame intended for the transmitting device (of the first wireless frame), the clear-to-send frame indicating a duration greater than or equal to a time necessary to transmit the remaining portion. In another aspect of the apparatus, the transmitter is further configured to transmit the second wireless frame protecting the wireless medium as a trigger frame, indicating a duration greater than or equal to a time necessary to transmit the remaining portion, the transmit parameters (e.g., MCS, BW, resource allocation [the channel allocation to be used for delivering the wireless frame], etc), wherein the trigger frame enables for transmission, after a predefined time (e.g., SIFS), one or more wireless devices in SU mode or MU mode, wherein the first wireless device is part of the one or more wireless devices.

Another aspect disclosed is a method of wireless communication over a wireless medium. The method includes transmitting, by a transmitting device, a first wireless frame to a receiving device during a contention period, the first wireless frame comprising a portion of a wireless communication exchange between the transmitting device and the receiving device, receiving a second wireless frame from the receiving device, the second wireless frame indicating a network allocation vector should be set for a time period, and completing, by the transmitting device, the wireless communication exchange with the receiving device during the time period.

In some aspects, the method also includes generating the first wireless frame to comprise an indication of a request for the receiving device to set the network allocation vector. In some aspects, the method also includes receiving, from the receiving device, a third wireless frame different than the second wireless frame, the third wireless frame comprising an indication that the receiving device will request the network allocation vector be set; and in response to the third wireless frame, deferring further transmissions of the wireless communication exchange until the network allocation vector is set. In some aspects, the method also includes decoding the third wireless frame to determine one or more of a confirmation of transmission parameters included in the first wireless frame, and one or more transmission parameters for transmission to the receiving device.

In some aspects, the method also includes: generating the first wireless frame as a data frame with a more data indication, wherein completing transmission of the wireless communication exchange comprises transmitting one or more additional data frames and receiving corresponding acknowledgments for the one or more additional data frames.

Another aspect disclosed is an apparatus for wireless communication over a wireless medium. The apparatus includes a transmitter configured to transmit a first wireless frame to a receiving device during a contention period, the first wireless frame comprising a portion of a wireless communication exchange between the apparatus and the apparatus, a receiver configured to receive a second wireless frame indicating a network allocation vector should be set for a time period, and completing the wireless communication exchange with the receiving device during the time period. In some aspects, the apparatus also includes a processor configured to generate the first wireless frame to comprise an indication of a request for the receiving device to set the network allocation vector. In some aspects, the apparatus also includes a processor, wherein the receiver is further configured to receive a third wireless frame comprising an indication that the receiving device will set the network allocation vector, and the processor is configured to, in response to the third wireless frame, defer further transmissions of the wireless communication exchange until the network allocation vector is set. In some aspects, the processor is further configured to decode the third wireless frame to determine one or more of a confirmation of transmission parameters included in the first wireless frame, and one or more transmission parameters for transmission to the receiving device. In some aspects, the apparatus also includes a processor configured to generate the first wireless frame as a data frame with a more data indication, wherein completing transmission of the wireless communication exchange comprises transmitting one or more additional data frames and receiving corresponding acknowledgments for the transmitted data frames.

DETAILED DESCRIPTION

Figure 1:
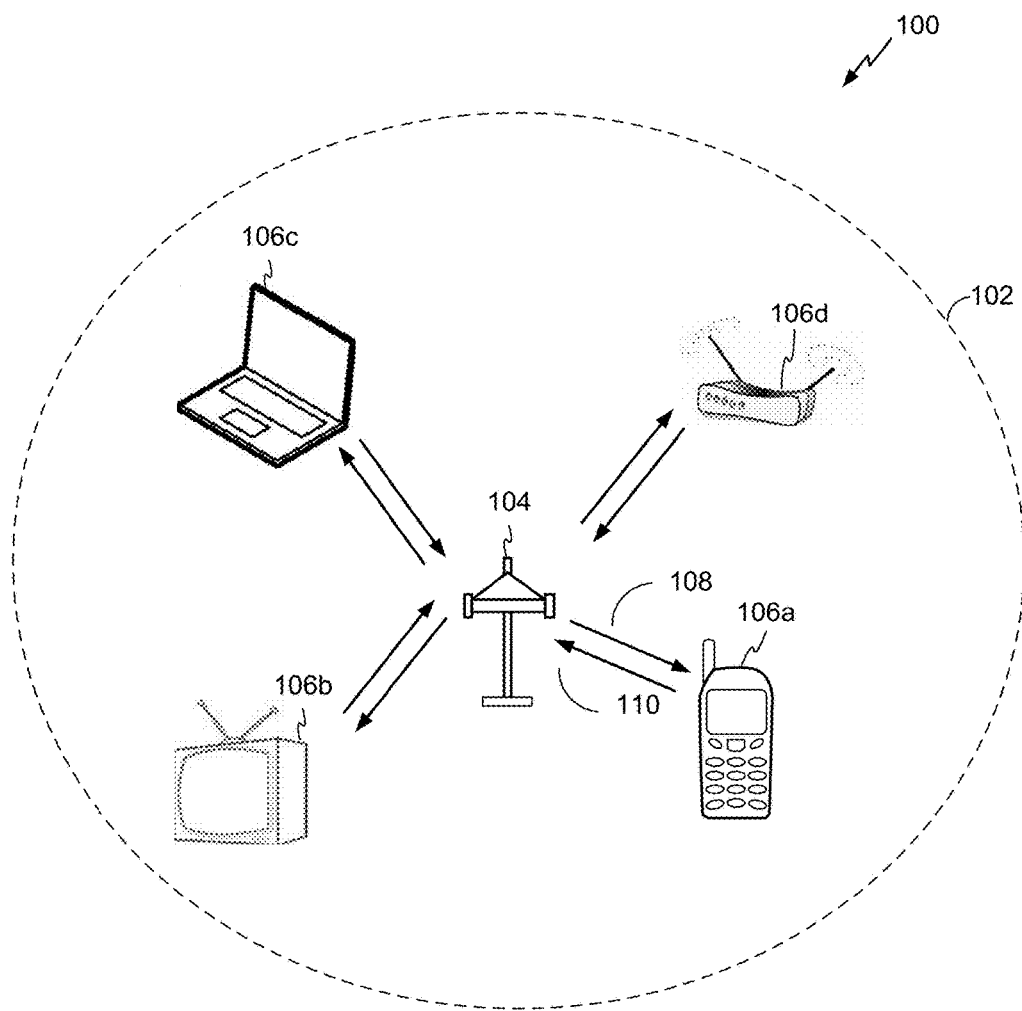
FIG. 1 shows an exemplary wireless communication system 100.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11 protocol using orthogonal frequency-division multiplexing (OFDM), frequency division multiplexing (FDM), time division multiplexing (TDM), direct-sequence spread spectrum (DSSS) communications, a combination of OFDM and DSSS communications, multi user (MU, multi-input multi output (MIMO)), or other schemes which can be used for single user (SU) or multi user (MU) communications. Implementations of the 802.11 protocol may be used for high efficiency, very high throughput, real time communications, sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer. Devices may also realize more efficient wireless communication due to reduced probability of collisions when utilizing the disclosed methods and systems.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., Institute of Electronical and Electronic Engineers (IEEE) 802.11 protocol such as 802.11) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, wireless devices operating within dense networks may at times experience packet collisions caused by transmissions of other devices operating on the same wireless medium and at times may not even be able to access the medium due to continuous usage of the medium by other devices. These collisions may degrade the communications efficiency of the wireless device and the wireless network as a whole. In some scenarios, a receiving device may experience a higher frequency of collisions than a transmitting device during a communications exchange between the two devices. In these scenarios, while the transmitting device may be able to contend for the wireless medium with an acceptable efficiency, the receiver's efficiency may be below an acceptable level. For example, a station in communication with an access point may transmit a frame when its random back-off expires. If the station is operating on a wireless medium with high utilization, there may be a high likelihood that this transmission will fail due to collisions with hidden nodes. Similarly such failures may be caused due to interference, channel conditions or wrong selection of transmit parameters by the transmitting device.

Upon detection of the failed transmission, the station may retransmit the frame after restarting its back-off timer. The restarted back-off timer may utilize a new random value that is larger than the previous random value, in some cases selected from a range of values that is double the previous range of values. Thus, time to gain access to the medium by the station is substantially increased in the presence of collisions. In some aspects, the station may retransmit the message at a lower data rate to increase the likelihood that the retransmission does not fail. This further compromises the media effective capacity for the station. In some instances, the station may experience continuous collisions, such that the station is essentially "starving" for medium access. The disclosed methods and systems resolve these issues, resulting in increased throughput, reduced latency, and increased network efficiency.

In particular, in the instances described above, it may be desirable for the receiving device to enable the access to the medium for the transmitting device and/or to protect the communication exchange with the transmitting device and reduce a frequency of collisions experienced by the receiving device during the exchange. Similarly, in some scenarios the transmitter may not be able to gain access to the medium such that it may transmit a frame to an intended receiver due to continuous usage of the medium by other devices. In these scenarios, it may be desirable for the receiver to enable access to the medium for the transmitting device as described herein.

The disclosed methods and systems provide for requesting and receiving protection of a medium during a wireless communication exchange. In some aspects, a device transmitting data requests that a device to which the transmitted data is addressed initiate the protection of the medium. This may differ from traditional methods that typically may have a device that intends to transmit data (for example, transmit a data message to a receiving device) also initiate protection for the data (for example, by transmitting a request to send message). Receiver initiated protection, as described above, may be particularly beneficial when a medium environment in proximity to a transmitter of the data is substantially different from the medium environment in proximity to the receiver of the data. For example, in some aspects, the receiver of the data may be experiencing a relatively high level of packet collisions, whereas the transmitter of the data may be experiencing a rather lower level of packet collisions. Therefore, in some aspects, it may be more effective for the receiver of the data to initiate the protection instead of the transmitter. For example, in some aspects, the transmitter may be effectively hidden from other devices with which its transmissions may be colliding. In other words, it may be desirable to initiate protection for a communication exchange at a device closest in proximity to potential collision inducing devices, or by a device with the highest likelihood of reaching potential collision inducing devices, such that those devices are more likely to receive frames indicating the protection (such as a request to send and/or clear to send) and set their network allocation vector appropriately. Thus, the disclosed methods and systems recognize that, unlike traditional methods, it is not always most effective for a transmitter of data to initiate protection for the data, but may be, in some situations, more effective for a transmitter to ask the receiver of the data to initiate the protection, and thus reach potential collision inducing nodes within a transmit range of the receiver.

There are several different types of wireless communication exchanges that may be protected by the methods and systems described herein. For example, one wireless communication exchange that may be protected is a sequence of data frames, with most of the data frames including a "more data" indication (except perhaps the last data frame that is part of the exchange). In this example, the transmitter of the data frames may request the receiver of the data frames to initiate the protection for the sequence of data frames or at least a portion of the sequence of data frames. The exchange may also include acknowledgements or block acknowledgments corresponding to each of the data frames.

More generally, a wireless communication exchange may take the form, in some embodiments, of: FRAME 1 ||SIFS|| (Optional [ACK1, NACK1, BlockAck1]) . . . [PREDEFINED TIME], FRAME 2||SIFS2||FRAME 3||[ACK2, NACK2, BA2]. The underlined portion may have multiple occurrences in some aspects. In the above generalized description, the PREDEFINED TIME is short interframe space (SIFS), or PCF Interframe Space (PIFS), or after Enhanced Distributed Channel Access (EDCA) contention. (also the above SIFS can be the predefined time).

FRAME 1 may be transmitted by/from a transmitter to a receiver: In some aspects, FRAME 1 may include an indication of a request for protection of the communication exchange. FRAME 1 may include a request for protection in several different ways depending on the embodiment. For example, if FRAME 1 contains one or more errors in portions of it when it is received (e.g., one or more MPDUs contained in it may be corrupted (i.e., one or more FCS fails), then this may be interpreted as a request for protection in some aspects. Alternatively, FRAME 1 may include an explicit indication of a request for protection. For example, in some aspects, a particular field in FRAME 1, if set to a predefined value, may be a request for protection. Some implementations may utilize a Retry bit of FRAME 1 for this indication. In some aspects, if Frame 1 contains an indication of additional data to be delivered to the recipient (More Data bit, Queue Size in the QoS Control field, Buffer Size in the HT Control field), this may indicate a request for protection of the wireless communication exchange. In some aspects, an explicit frame type is defined to request protection. For example, an RTS frame may fit into this category. In the above description, the ACK1, NACK1, BA1 are sent from the receiving device (the device acknowledging the data) to the transmitting device (the device transmitting the data).

In the above example of a wireless communication exchange, Frame 2 is transmitted from the receiver to transmitter (and can be addressed to multiple transmitters if, for example, it is a trigger frame). Frame 2 may be a clear-to-send frame that is transmitted with a receiver address field set to the transmitter address field (a so called "CTS-To Self"), a Trigger frame (which can be addressed to one or more transmitters (one of which is "our" transmitter, an MU PPDU that contains one or more (A-)MPDUs, which can contain the Trigger frame as one or more of the MPDUs, or may contain the trigger information in the MAC header of the MPDUs, etc. In some aspects, Frame 2 may function to replace the ACK1, NACK, BA1 in the sequence. FRAME 3 may be sent from the transmitter to the receiver (and may be sent in a multi user PPDU, in some aspects along with frames from other transmitters, if the FRAME 1 includes subchannel allocations, and other TX parameters, for sending the frames).

In some aspects, FRAME 3 includes one or more MPDUs which are derived from the information indicated or obtained from Frame 1 (e.g., one or more MPDUs could be the ones that failed one transmitted in Frame 1, or whose presence was indicated in Frame 1 etc. ACK2, NACK2, or BA2 may be transmitted from the receiver to the transmitter.

Enabling access to the medium may include transmitting a message from the receiver to the transmitter that allows the transmitter to discard or otherwise ignore previously set network allocation vector (NAV) durations or deferral mechanisms and access the medium to initiate the communications exchange within a predefined time after reception of the frame that is transmitted by the receiver. The predefined time may be short interframe space (SIFS), point coordination function (PCF) Interframe Space (PIFS) or some known duration of time. Protection of the communication exchange may include transmitting one or more messages that cause devices on the medium (and receiving the messages) to set their NAV for a duration of time. The network allocation vector (NAV) may be a virtual carrier-sensing mechanism used to limit the need for physical carrier-sensing at a wireless air interface in order to save power. For example, in some aspects, a MAC layer frame header may contain a duration field that specifies the transmission time required for a frame or series of frames, in which time the medium will be busy. In another example, a PHY layer frame header may contain a duration field, wherein the duration field may be located in the L-SIG or in the SIG-A portion of the PHY header. Stations listening on the wireless medium read the duration field and set their network allocation vector, which is an indicator for a station on how long it must defer from accessing the medium.

In some aspects, the network allocation vector may be implemented as a counter, which counts down to zero at a uniform rate. When the counter is zero, the virtual carrier sense mechanism provided by the NAV indicates that the medium is idle. When the NAV is non-zero, this indicates that the medium is busy.

Messages that set network allocation vectors may include, for example, clear-to-send messages and/or trigger messages (wherein in this context a trigger message enables the one or more intended receivers of the trigger to transmit their data within a predetermined period of time following the trigger, wherein the data is transmitted in single user or in multi user mode (i.e., in specified time/space/frequencies provided by the trigger frame itself), or Null Data Packets (e.g, a frame that consists only of the PHY header contents). Transmission of these messages may inhibit transmissions of those devices (that are not the intended receiver(s) of the messages) for the duration, thus reducing the number of packet collisions experienced by the receiving device during the duration of time. Since the receiving device transmits the messages in some of the disclosed aspects, a first set of wireless devices may receive the messages as compared to a second set of devices that may receive similar messages transmitted by the transmitting device. This may be advantageous in some scenarios. For example, if a device that is somewhat distant from a transmitting device is included in the first set of devices but not in the second set of devices, transmissions by the transmitter distant device may not be inhibited if the transmitting device transmits the NAV setting messages (because the transmitter distance device may not receive the messages—due to its distance from the transmitter). Note that within the following description, one that is skilled in the art may realize that reference to a single transmitter may include any number of transmitters. For example, when a particular disclosed message is sent by a device, the device may enable a multitude of transmitters to transmit following the message as described herein.

Additionally, in some aspects, an intended receiver device of transmissions may be in a better position to determine whether transmissions are being successfully received by it than the transmitting device. Thus, the receiving device may condition application of the disclosed techniques, which may cause a NAV to be set, on whether packets transmitted/received during a contention period are successfully received by the device. Thus, the receiving device may be able to apply knowledge that the transmitting device is unable to apply. Thus, setting the NAV to protect a communication exchange may be performed only when necessary, thus improving the ability of devices on the medium to coexist and increasing medium utilization generally.

Thus, when the receiving device transmits the disclosed NAV setting messages, there may be an increased probability that the receiver will experience improved efficiency as compared to methods that provide for the transmitting device to set the NAV.

FIG. 1 shows an exemplary wireless communication system 100. The wireless communication system 100 may operate pursuant to a wireless standard, for example the 802.11 standards. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with Code Division Multiple Access (CDMA) techniques. If this is the case, the wireless communication system 100 may be referred to as a CDMA system. Maybe good to specify MU, SU and MIMO here as well, and FDM and FDMA, both multicarrier and single carrier.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. When the link is between one STA and a peer STA it is referred to as single user (SU) while a link between one STA and one or more STAs is referred to multi user (MU). Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe or as a beacon interval. Transmission of a beacon may be divided into a number of groups or intervals. In one aspect, the beacon may include, but is not limited to, such information as timestamp information to set a common clock, a peer-to-peer network identifier, a device identifier, capability information, a superframe or beacon interval duration, transmission direction information, reception direction information, a neighbor list, and/or an extended neighbor list, some of which are described in additional detail below. Thus, a beacon may include information both common (e.g., shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
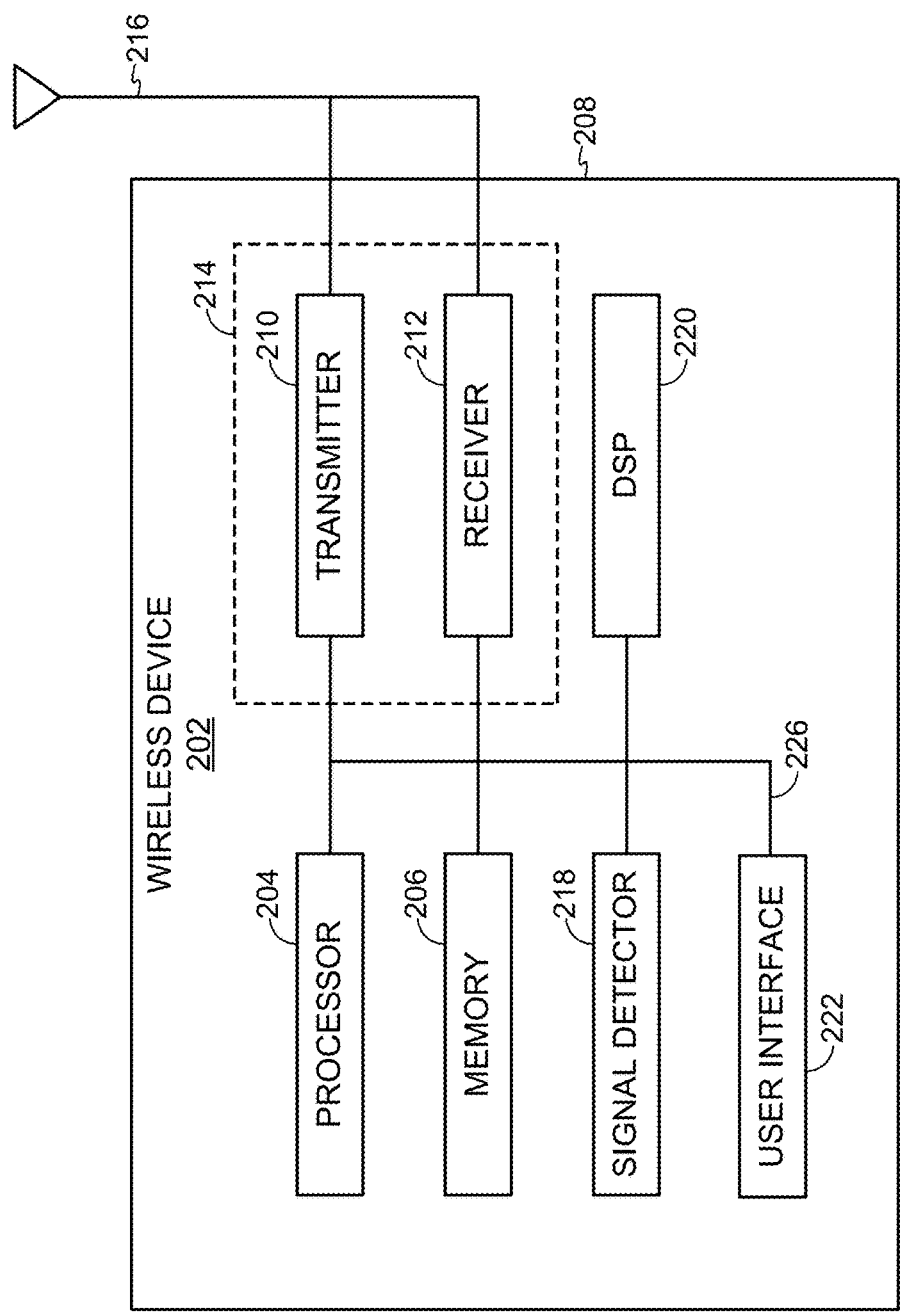
FIG. 2 shows an exemplary functional block diagram of a wireless device 202 that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104, or one of the STAs 106. The wireless device 202 may comprise a first wireless device or a second wireless device.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical protocol data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104, or a STA 106, and may be used to transmit and/or receive communications. That is, either AP 104, or STA 106, may serve as transmitter or receiver devices. Certain aspects contemplate signal detector 218 being used by software running on memory 206 and processor 204 to detect the presence of a transmitter or receiver.

Figure 3:
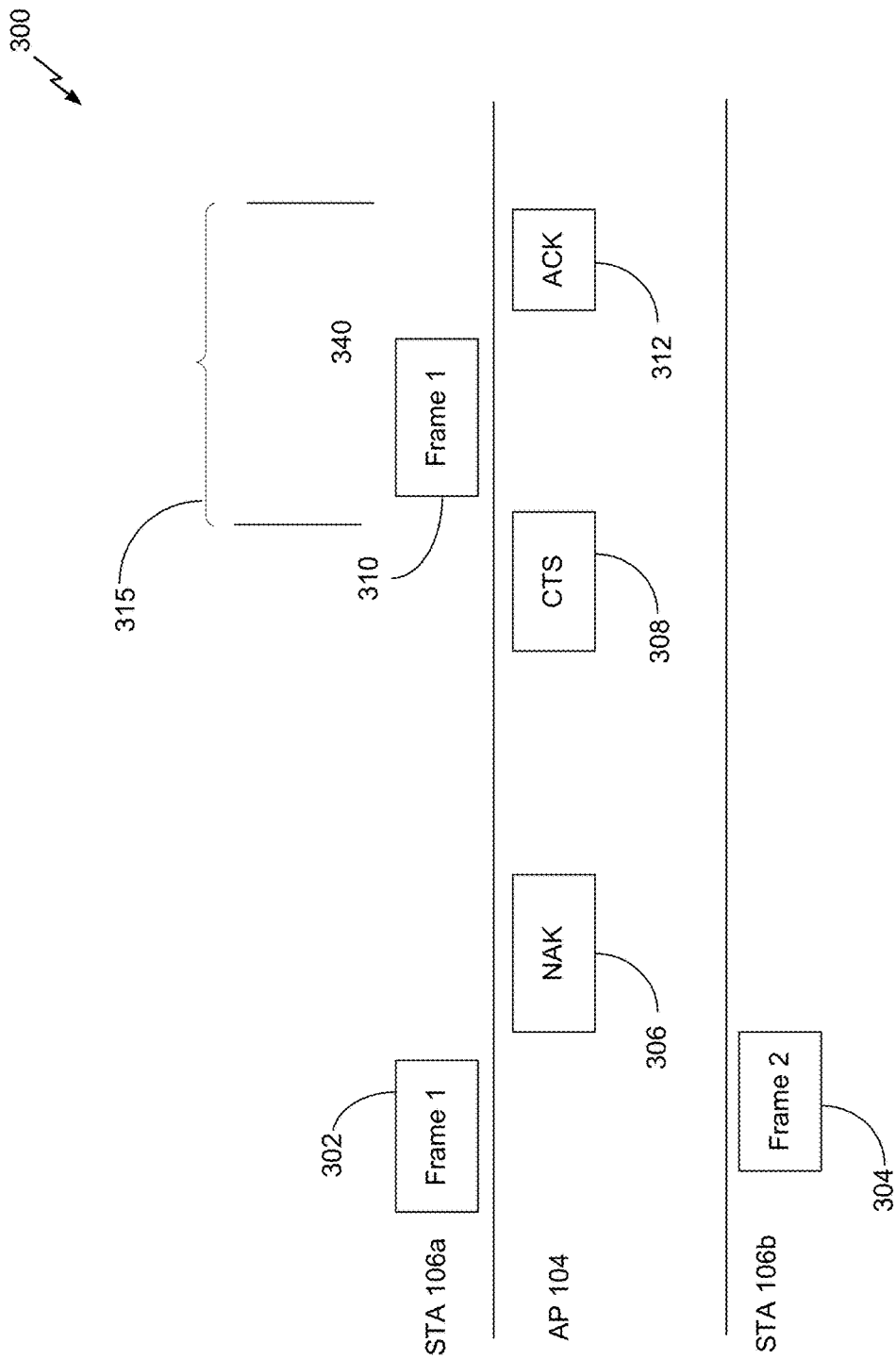
FIG. 3 is a timing diagram of one embodiment of a wireless communication exchange between an access point and a station (STA).

FIG. 3 is a timing diagram of one embodiment of a wireless communication exchange 300 between an access point 104 and a station 106a. FIG. 3 depicts the AP 104 within a dense networking environment. For example, AP 104 may be within proximity of one or more other wireless devices, for example, at least station 106b as shown. The timing diagram begins at the left with the STA 106a transmitting frame 1 302 to the AP 104. Because AP 104 is within a dense network environment, the transmission of frame 1 may at least partially overlap with the transmission of another frame from another wireless device. As shown, STA 106b transmits "Frame 2" 304 partially simultaneously with "Frame 1" 302. This partial simultaneous transmission may cause corruption of "Frame 1" 302 when received by AP 104.

While Frame 1 may be at least partially corrupted when received by the AP 104, the AP 104 may still be able to determine some information from the corrupted frame. For example, in some cases, the device transmitting the frame may be determined via a transmitter address field included in the frame. Other relevant information may also be obtained from the corrupted frame. For example, information such as any one or a modulation and coding scheme (MCS), transmission bandwidth information, duration information from the frame, and the intended receiver may be determined. In some cases, this information may be contained in one or more portions of a PHY header of the frame. For example, in some aspects, a cyclic redundancy check (CRC) for the PHY header may indicate the PHY header was received correctly. In response to this indication, some aspects may decode on one or more fields from the PHY header and rely on those values for further processing. In some aspects, information may also be decoded from a media access control (MAC) header of the received frame. Information in the MAC header may or may not be protected by a CRC or similar error correction mechanisms. Some aspects may utilize process 700, discussed below with respect to FIG. 8, to obtain certain information from a partially corrupted frame.

Because the "Frame 1" 302 is corrupted upon reception by AP 104, in the example message exchange of FIG. 3, AP 104 transmits a negative acknowledgment frame 306 to STA 106a. In some aspects, a negative acknowledgment may be indicated via an acknowledgment frame that has any field in a frame control field set to a non-zero value. For example, in some aspects, an acknowledgment packet with a retry field set to a value of one may indicate a negative acknowledgment. The negative acknowledgment frame 306 may also indicate that the AP 104 will protect further portions of the wireless communication exchange 300 by setting the network allocation vector for a period of time sufficient or time necessary to allow the exchange to complete. This indication may be provided by setting one or more fields in the negative acknowledgment frame 306 to particular value (s). For example, a duration field of the negative acknowledgment frame 306 may indicate a necessary time for completing the wireless communication exchange.

The negative acknowledgment frame 306 may also include indications of one or more suggested transmission parameters for the transmitting device (in this case, the STA 106a) to use when retransmitting "frame 1" 302. For example, the negative acknowledgment frame 306 may include an indication of a new modulation and coding scheme (MCS), transmission bandwidth, or alternative channel information, such as channel allocation information or a suggestion to use a particular secondary channel). In some aspects, the negative acknowledgment frame may also indicate an amount of time it will allocate for protection of the remaining portion of the wireless communication exchange 300.

Upon receiving the negative acknowledgment frame including the indications discussed above, the STA 106a may defer additional transmissions on the wireless medium for a period of time. In some aspects, the negative acknowledgment frame 306 may indicate a time when the AP 104 will initiate protection by setting the network allocation vector (NAV). In these aspects, the STA 106a may defer additional transmissions until at least the indicated time. In some aspects, the period of deferral may be fixed, or pre-negotiated.

While FIG. 3 shows the transmission of the negative acknowledgment frame 306, in some aspects, negative acknowledgment frame 306 may not be transmitted. In these aspects, both STA 106a and AP 104 may begin contending for the medium after frame 1 302 is transmitted. The AP 104 may contend for the medium to send the message that would allow STA 106a to gain access to the medium for retransmitting "frame 1" 302, such as clear-to-send frame 308 discussed below. The STA 106a may contend for the medium in order to retransmit "frame 1" after the STA 106a determines the transmission was unsuccessful. Alternatively the STA 106a may contend for the medium in order to transmit a request to send (RTS) frame to the AP 104).

The AP 104 then starts contending for the wireless medium and then transmits a clear-to-send (CTS) frame 308 when it wins contention. In some aspects, the clear-to-send frame 308 may be addressed to the STA 106a. For example, an A1 field of the CTS frame 308 may identify the STA 106a (for example, by station address). The CTS frame 308 may set the network allocation vector 315 for a period of time, for example, via a duration field in the CTS frame 308. By setting the network allocation vector via the CTS frame, the receiver device (in this case, the AP 104) may enable the STA 106a to retransmit Frame 1 under the protection from collisions provided by the NAV for the allocated duration of time indicated in the CTS frame.

In some aspects, the CTS frame 308 may instead be any frame that would enable a reverse direction transmission (such as a reverse direction protocol). In some aspects the frame may be a trigger frame (not shown in FIG. 3. The trigger frame may allocate resources for one or more uplink stations (of which one is the STA 106a), such that these STAs may transmit their UL data as a response to the Trigger frame, after a predefined time (e.g., after SIFS) in the corresponding resources and using the transmit parameters that are specified in the Trigger frame itself. The trigger frame may include a transmission schedule specified by the AP 104. In some aspects, the transmission schedule included in the trigger frame may provide a schedule for one or more multi-user frames to be transmitted as an uplink transmission. In some aspects, the trigger frame may be followed by one or more downlink frames that may be destined for devices other than but also including the STA 106a.

Upon determining that the AP 104 has provided protection for the wireless communication exchange 300, as indicated in the negative acknowledgment frame 306 in certain embodiments, the STA 106a then retransmits "Frame 1" as packet 310. The acknowledgment 312 completes wireless communication exchange 300. Note that the AP 104 may transmit additional frames to the 106a (which may include "Frame 1").

While FIG. 3 shows the AP 104 transmitting and receiving particular messages, in some aspects, the devices shown in FIG. 3 may be reversed. For example, messages transmitted by the AP 104 in FIG. 3 may instead be transmitted by the STA 106a. Similarly, messages transmitted by the STA 106a in FIG. 3 may instead be transmitted by the AP 104.

Figure 4A:
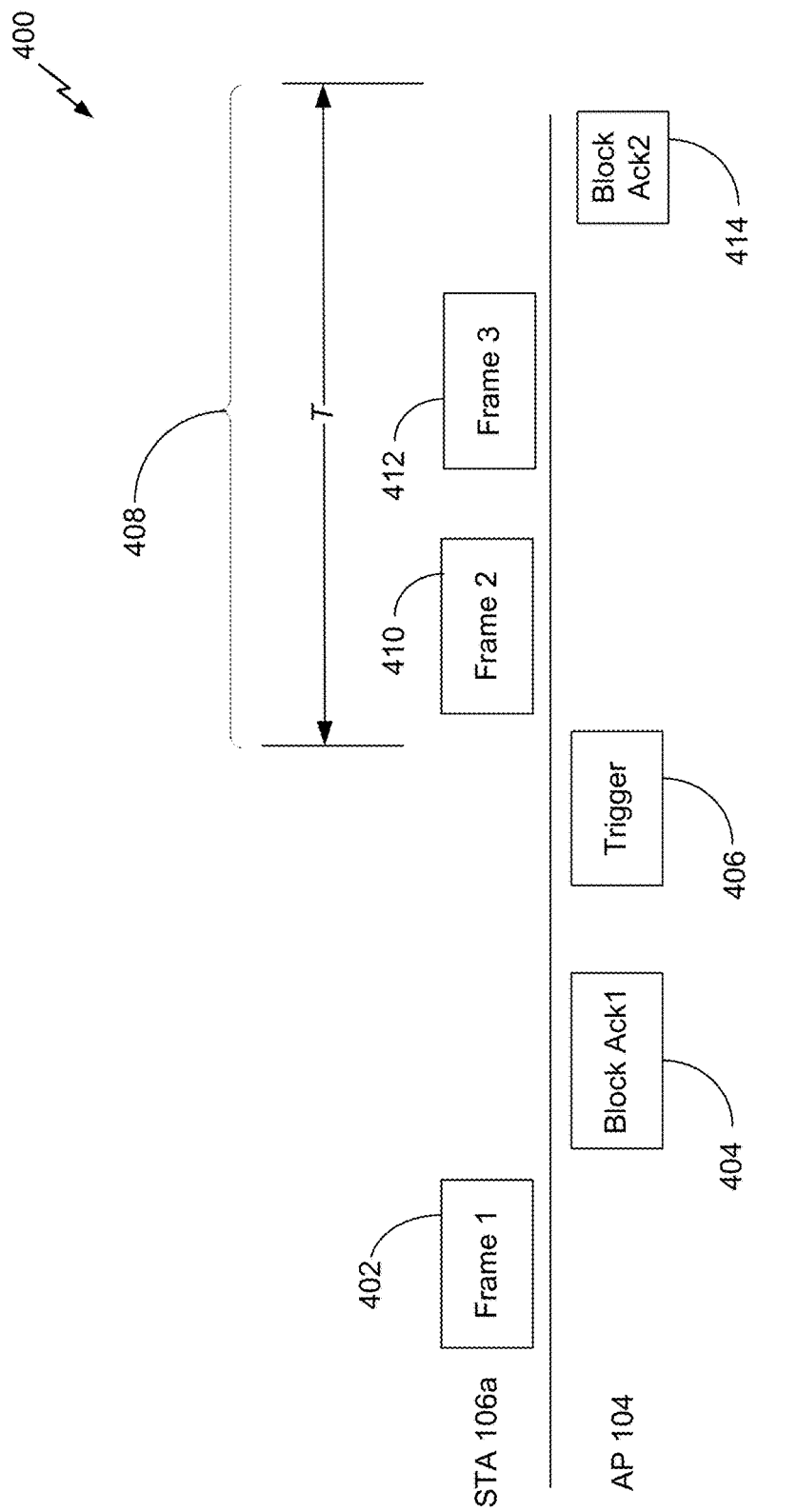
FIG. 4A is another timing diagram of one embodiment of a wireless communication exchange between an access point and a station.

FIG. 4A is another timing diagram of one embodiment of a wireless communication exchange 400 between an access point 104 and a station 106a. FIG. 4A depicts the AP 104 within a dense networking environment. For example, AP 104 may be within proximity of one or more other wireless devices, for example, at least station 106b as shown.

The wireless communication exchange 400 begins with the STA 106a transmitting a frame 402. In some aspects, the frame 402 may include a more data indication and/or may carry more than one data packet. In some aspects, one or more portions of the frame 402 may be corrupted. While frame 402 may be at least partially corrupted when received by the AP 104, the AP 104 may still be able to determine some information from the corrupted frame. For example, in some cases, the device transmitting the frame may be determined via a transmitter address field included in the frame. Other relevant information may also be obtained from the corrupted frame. For example, information such as one or more of a modulation and coding scheme (MCS), transmission bandwidth information, duration information from the frame 402, and the intended receiver may be determined. In some cases, this information may be contained in one or more portions of a PHY header of the frame 402, such as in the L-SIG, or SIG-A or SIG-B of the PHY header. For example, in some aspects, a CRC (or a parity bit) for the PHY header may indicate that the corresponding portion of the PHY header it protects was received correctly. In response to this indication, some aspects may decode on one or more portions/fields from the PHY header and rely on those values for further processing. In some aspects, information may also be decoded from a media access control (MAC) header of the received frame 402. Information in the MAC header may or may not be protected by a CRC or similar error correction mechanisms. Some aspects may utilize process 700, discussed below with respect to FIG. 8, to obtain certain information from the partially corrupted frame 402.

The AP 104 then transmits a block acknowledgment message 404, at least partially acknowledging one or more of the data frames that are contained in the frame 402. When one or more of the data frames included in frame 402 are corrupted, the block acknowledgment message 404 indicates that those particular frames were not received successfully. The block acknowledgment message 404 may also include a first indication that the STA 106a will protect a remaining portion of the wireless communication exchange 400. The block acknowledgment message 404 may also include a second indication of an estimated time when the STA 106a will initiate the protection. For example, the indication of the estimated time may be a relative time offset from the transmission of the block acknowledgment message 404.

The block acknowledgment message 404 may also include indications of one or more suggested transmission parameters for the transmitting device (in this case, the STA 106a) to use when retransmitting frame 402. For example, the block acknowledgment message 404 may include an indication of a new modulation and coding scheme (MCS), transmission bandwidth, or alternative channel information, such as channel allocation information or a suggestion to use a particular secondary channel. In some aspects, the block acknowledgment message 404 may also indicate an amount of time the AP 104 will allocate for protection of the remaining portion of the wireless communication exchange 400.

Upon receiving the block acknowledgment message 404 that indicates the first indication, the STA 106a may defer transmissions of the wireless communication exchange until at least the time indicated by the second indication. Alternatively, the STA 106a may defer for a predetermined or negotiated period of time in response to receiving the first indication.

The AP 104 then transmits the trigger frame 406. In some aspects, the trigger frame 406 may include a transmission schedule for one or more frames to be transmitted by the STA 106a. In some aspects, the transmission schedule may also schedule one or more frames to be transmitted by another device other than the STA 106a. The trigger frame sets the network allocation vector 408 of devices receiving the trigger frame 406 for a period of time T. In some aspects, the trigger frame 406 may be a clear-to-send (CTS) frame. For example, in some cases, the AP 104 may determine that it will only schedule a data exchange with the STA 106a, for example, when no other data transmissions are pending with other devices associated with the AP 104. In this case, the AP 104 may determine to use a CTS frame to reserve the NAV instead of the trigger frame shown in FIG. 4A.

Upon determining that the AP 104 has protected a remaining portion of the wireless communication exchange 400, the STA 106a transmits frame 410 and frame 412. In some aspects, frame 410 may include a more data indication while frame 412 does not. AP 104 then acknowledges frame 410 and frame 412 via block acknowledgment 414, completing the wireless communication exchange 400.

While FIG. 4A shows the AP 104 transmitting and receiving particular messages, in some aspects, the devices shown in FIG. 4A may be reversed. For example, messages transmitted by the AP 104 in FIG. 4A may instead be transmitted by the STA 106a. Similarly, messages transmitted by the STA 106a in FIG. 4A may instead be transmitted by the AP 104.

Figure 4B:
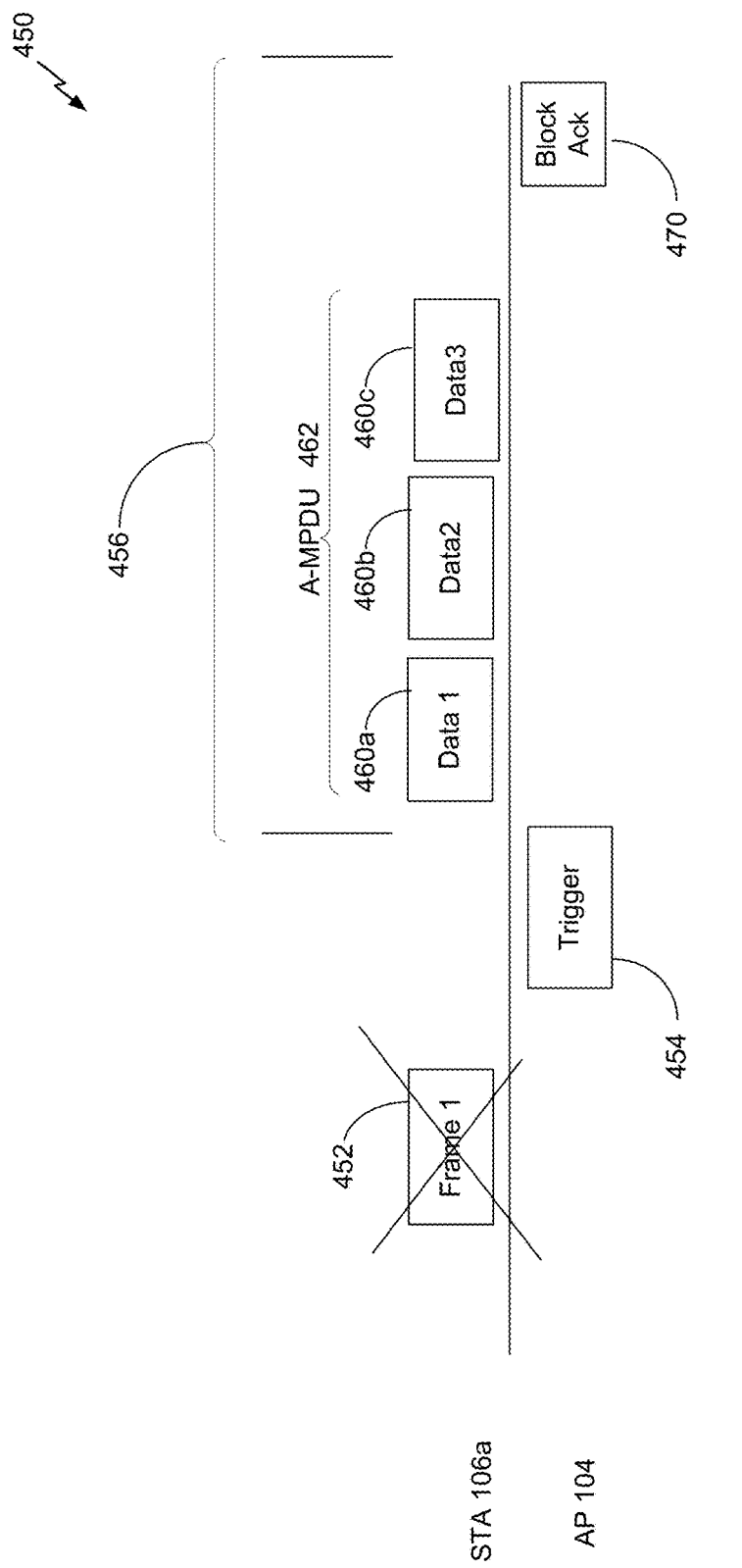
FIG. 4B is another timing diagram of one embodiment of a wireless communication exchange between an access point and a station.

FIG. 4B is another timing diagram of one embodiment of a wireless communication exchange between an access point 104 and a station 106a. Timing diagram 450 depicts the station 106a within a dense networking environment. For example, station 106a may be within proximity of one or more other wireless devices.

The timing diagram begins with the STA 106a transmitting a frame 452. The frame 452 may be transmitted during a contention period, when other devices may contend for access to the wireless medium along with the STA 106a. A collision between the frame 452 and another frame (not shown) may occur, such that frame 452 is at least partially corrupted when received by the AP 104. However, the AP 104 may still be able to determine that the frame 452 originated from the STA 106a. For example, this determination may be made in some aspects using process 700 discussed in more detail below.

In response to reception of frame 452, which may be partially corrupted, by the AP 104, the AP 104 may determine that protection from collisions may be provided for a remaining portion of a wireless communication exchange with the STA 106a. As discussed above with respect to FIG. 4A, despite the frame 452 being corrupted, some information may still be obtained by the receiving device AP 104. For example, in some cases, the device transmitting the frame may be determined via a transmitter address field included in the frame. Other relevant information may also be obtained from the corrupted frame 452. For example, information such as one or more of a modulation and coding scheme (MCS), transmission bandwidth information, duration information from the frame 452, and the intended receiver may be determined. In some cases, this information may be contained in one or more portions of a PHY header of the frame 452. For example, in some aspects, a CRC for the PHY header may indicate the PHY header was received correctly. In response to this indication, some aspects of the AP 104 may decode on one or more fields from the PHY header and rely on those values for further processing. In some aspects, information may also be decoded from a media access control (MAC) header of the received frame 452. Information in the MAC header may or may not be protected by a CRC or similar error correction mechanisms. Some aspects may utilize process 700, discussed below with respect to FIG. 8, to obtain certain information from the partially corrupted frame 452.

As shown in FIG. 4B, the AP 104 may respond by transmitting a trigger frame 454. In some aspects, the trigger frame may define a transmission schedule. In some aspects, the transmission schedule may schedule transmissions from the STA 106a as part of a multi-user transmission which is performed at a time after the trigger frame. The trigger frame may be transmitted by the AP 104 during a contention period. The trigger frame causes the NAV 456 to be set as shown, such that data can be received from the STA 106a with a reduced risk of corruption from collisions. For example, the trigger frame 454 may include a duration field indicating the length of the NAV 456. Note that while not shown in the figure one or more STAs may be allocated to transmit during the scheduled transmission time using multi-user transmissions such as MU-MIMO or OFDMA.

At a time indicated by the trigger frame 454, the STA 106a transmits three data packets 460a-c, which are all included in a single aggregated media protocol data unit (A-MPDU) 462. The AP 104 may acknowledge one or more of the data packets 460a-c with block acknowledgment packet 470, which is also transmitted under the protection provided by the trigger frame 454.

While FIG. 4B shows the AP 104 transmitting and receiving particular messages, in some aspects, the devices shown in FIG. 4B may be reversed. For example, messages transmitted by the AP 104 in FIG. 4B may instead be transmitted by the STA 106a. Similarly, messages transmitted by the STA 106a in FIG. 4B may instead be transmitted by the AP 104.

Figure 5A:
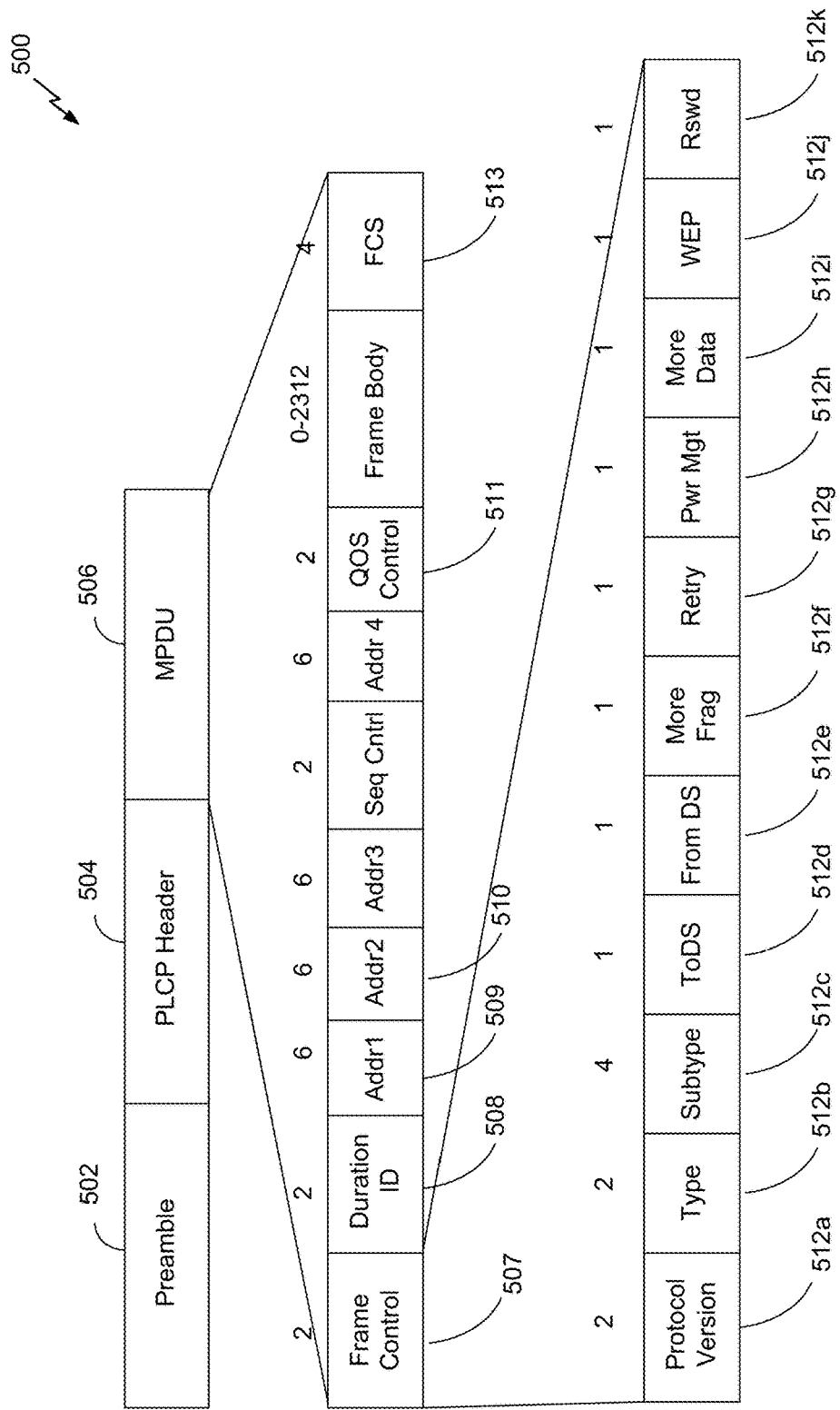
FIG. 5A shows an example of a media access control frame.

FIG. 5A shows an example wireless frame. The frame 500 includes one or more of the following a legacy preamble 502, physical layer (PLCP) header 504 (which may contain one or more of an STF, LTF, SIG-A, SIG-B etc.), and one or more media access control (MAC) protocol data units (MPDU) 506, wherein the one or more MPDUs may be carried as part of an aggregated MPDU (A-MPDU), which is a structure that precedes each MPDU by an MPDU delimiter, specifying the length of the MPDU and other information relevant for processing the MPDU, and a certain amount of bytes (generally 0 to 3) follow each MPDU for padding purposes so that the overall length of the A-MPDU subframe is a multiple of 4 octets. As an example, each MPDU 506 includes one or more of the following fields: a frame control field 507, duration id field 508, a first address field 509, second address field 510, a Quality of Service (QOS) control field 511, HT Control field and frame check sequence field 512, along with other fields. The frame control field 507 includes a protocol version field 512a, type field 512b, subtype field 512c, ToDS field 512d, FromDS field 512e, more fragment field 512f, Retry field 512g, Pwr Mgt field 512h, More Data field 512i, Protected Frame (WEP) field 512j, and Order field 512k (this would be the general structure when protocol version (PV) is zero (0)). Other structures are also contemplated (e.g., PV=1 frames have a different organization)

In some aspects, implementations may set the more fragment field 512f to request that a receiver of the frame 500 initiate protection for a data communications exchange including the frame 500. For example, in some aspects, a message conforming with frame 500 described with respect to FIG. 5 may be transmitted, but includes only a portion of data for a destination device of the frame 500. Thus, in some aspects, the message may be sent with the more data field 512i set to a value of one (1). However, to ensure reliable communication of a remaining portion of data transmitted in subsequent frames, the transmitting device of the message may request the receiving device (i.e. a device identified by a receiver address of the frame 500), to initiate protection by setting the more fragment field 512f. In some embodiments, the Retry field or any other field present in frame 500 can be used for this purpose.

The transmission parameters of the frame 500 are located in the PHY header of the PPDU carrying one or more of the MPDUs, one of which can be frame 500. The PHY header of the PPDU may contain one or more of the following parameters (though not limited to) a modulation and coding scheme (MCS), bandwidth, number of spatial streams (NSS), PPDU duration, network allocation vector (NAV) duration, transmitter identifier, receiver identifier, direction of the frame (e.g., UL or DL), use of LDPC or BCC, subchannel index within the bandwidth used for transmitting the payload (i.e., the (A-)MPDU), SU/MU mode, BSS color (identifier), etc.

Figure 5B:
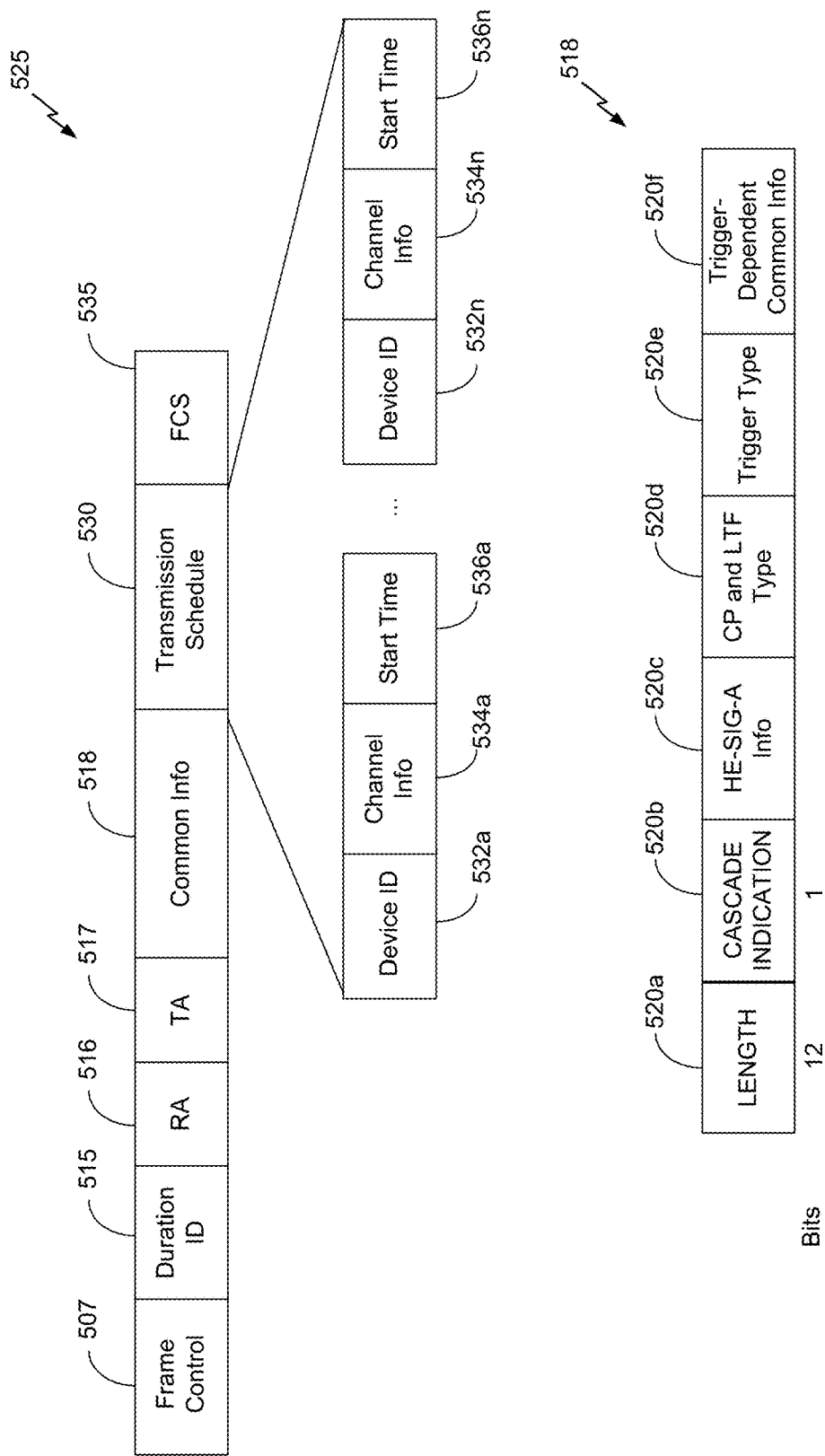
FIG. 5B shows an example of a trigger frame.

FIG. 5B shows an exemplary trigger frame 525. In some aspects, the trigger frame 525 may be a clear to send frame. The trigger frame 525 includes a frame control field 507, duration field 515, a receiver address field 516, a transmitter address field 517, a common info field 518, and a transmission schedule 530.

The transmission schedule field 530 defines when transmissions may occur from one or more devices, identified by the device id fields 532a-n during the protection initiated by a device transmitting the trigger frame 525. Also included in the exemplary trigger frame 525 are channel information fields 534a-n and optionally start time fields 536a-n. The channel information fields 534a-n may indicate one or more of a channel allocation information, modulation and coding scheme, spatial channel identifiers, and/or frequency identifiers for use during a multi-user transmission with other devices identified by the device identifier fields 532a-n. The start time fields 536a-n may provide a time reference indicating a time when transmissions to the device sending the frame 525 should be initiated. In some aspects, the start time may be relative to the time of transmission of the trigger frame 525. In certain embodiments, as described above, the start time field can be predetermined (e.g, after SIFS or PIFS) following the trigger frame.

The common info field 518 may include a length field 520a, cascade indication 520b, he-sig-a information field 520c, a CP and LTF Type field 520d, a trigger type field 520e, and a trigger dependent common info field 520f. The length field 520a of the Common Info field 518 may indicate the value of the L-SIG Length field of the HE trigger-based PPDU that is the response to the Trigger frame. If the cascade indication field 520b is 1, then a subsequent Trigger frame follows a current Trigger frame. Otherwise the Cascade Indication field 520b is zero (0). The HE-SIG-A Info field 520c may indicate the content of the HE-SIG-A field of the HE trigger-based PPDU response. The TBD bits in HE-SIG-A of the HE trigger-based PPDU that may be implicitly known by all responding STAs can be excluded. The CP and LTF Type field 520d may indicate the CP and HE-LTF type of the HE trigger-based PPDU response. The Trigger Type field 520e indicates the type of the Trigger frame. The Trigger frame can include an optional type-specific Common Info and optional type-specific Per User Info.

Figure 5C:
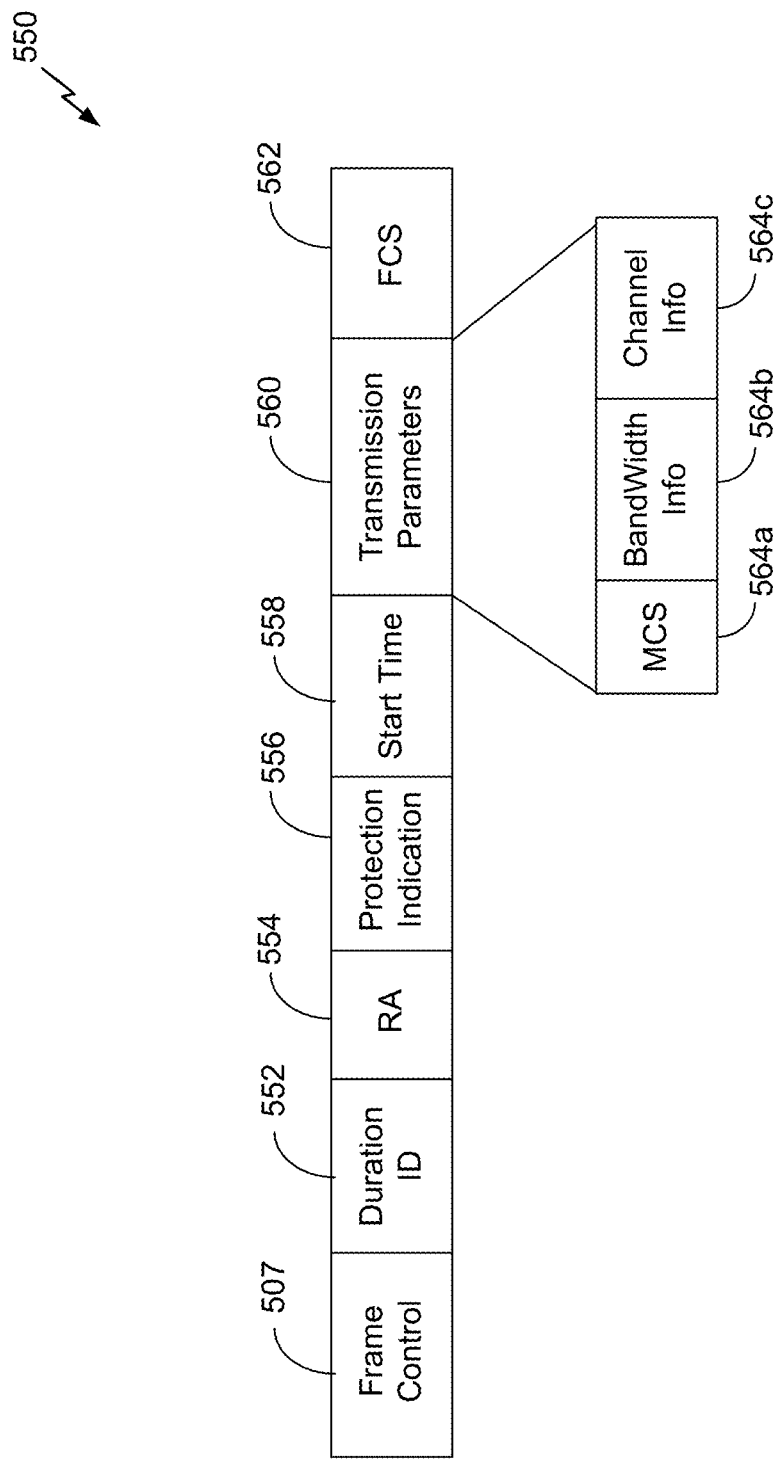
FIG. 5C shows an example of a response frame.

FIG. 5C is an exemplary response frame to a frame that was at least in part a corrupted frame. In some aspects, the response frame 550 may take the form of an acknowledgment frame, block acknowledgment frame, or negative acknowledgment frame. The response frame 550 may include the frame control field 507, duration field 552, receiver address field 554, protection indication field 556, start time field 558, transmission parameters field 560, and frame check sequence field 562. In some aspects the response frame may be a control response frame that carries an HT Control field, where in the HT Control field may carry the transmission parameters and the other fields.

In some aspects, the response frame 550 may be transmitted in response to receiving a frame requesting protection for a wireless communication exchange. For example, in some aspects, the response frame 550 may be transmitted in response to receiving a frame 500 with the more fragment field 512f set to a value of one (1) (or another value), requesting protection for a remaining portion of a wireless communication exchange.

The protection indication field 556 may indicate whether a transmitter of the response frame 550 will cause a network allocation vector (NAV) to be set to protect a remaining portion of a wireless communication exchange. For example, in some aspects, the response frame 550 may acknowledge a data packet having a more data field, such as more data field 512i in frame 500 of FIG. 5A, with a value set to one (1) (or another value is other aspects). If the protection indication field 556 is set to a one, it may indicate the transmitter of the response frame 550 will cause the NAV to be set for a time period estimated to be sufficient to complete the data transfer of data that is part of the data communication exchange. The data communication exchange may include the transfer of data from a data sending device to a data receiving device. The data sending device may be addressed by the response frame 550 (for example, by the receiver address field 554 of the response frame 550 (not shown) may identify the data sending device). The data receiving device may be the device transmitting the response frame 550.

The transmission parameters field 560 may include at least one or more of a modulation and coding scheme (MCS) 564a, transmission bandwidth information 564b, and channel information 564c such as channel allocation information. In some aspects, values in the transmission parameters field 560 may indicate how a subsequent transmission, performed under the protection indicated by protection indication field 556, is to be performed.

Figure 6:
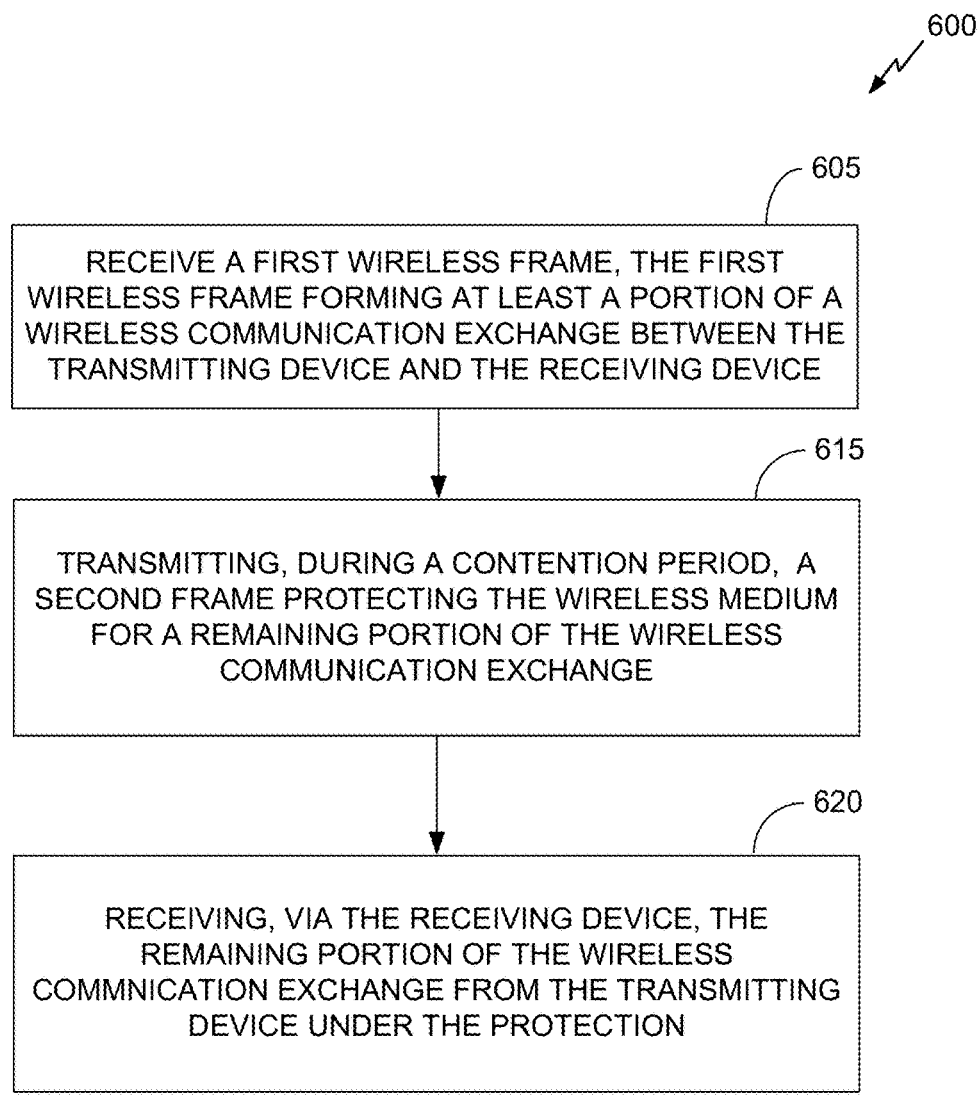
FIG. 6 is a flowchart of a method of wireless communication.

FIG. 6 is a method of wireless communication. In some aspects, process 600 may be performed by either a station or an access point. For example, process 600 may be performed by the AP 104 described with respect to FIGS. 3 and 4A-B above. In some aspects, the process 600 may be performed by the wireless device 202, described above with respect to FIG. 2. For example, instructions stored in the memory 206 may configure the processor 204 to perform one or more of the functions discussed below with respect to process 600.

Process 600 may allow a device receiving one or more frames from another device that would otherwise be transmitted/received during a contention period to instead initiate protection for those frames by causing a network allocation vector to be set. Once the network allocation vector is set, the frames may then be transmitted/received under the protection from collisions provided by the NAV. This protection may be especially valuable when the receiving device is within a dense network environment, where the probability of packet collisions is relatively high. By initiating protection of the wireless communication exchange, a receiver can better ensure successful completion of the communication exchange at an acceptable packet loss/efficiency level. Note that while the descriptions refer to a NAV protection mechanism, in some other aspects, the protection may be provided by any other protection mechanism, such as setting the duration field of the L-SIG field of the frame initiating the exchange, etc.

In block 605, a first wireless frame is received. The first wireless frame is received by a receiving device. The first wireless frame is part of a wireless communication exchange between a transmitting device and the receiving device. A wireless communication exchange may include an exchange of messages between two devices, the receiving device and a transmitting device, with each of the messages having an association with each other. For example, a data packet and an acknowledgment of the data packet may form a wireless communication exchange in some aspects. In some other aspects, a series of data frames including one or more additional data frames, with each eventually including a more data indication, except for perhaps a last data frame of the series, along with one or more acknowledgment frames acknowledging the transmitted data frames may form another wireless communication exchange in some aspects. In some aspects the acknowledgment packets may be block acknowledgment frames. In some aspects, the wireless communication exchange may be a series of data packets exchanged in both uplink and downlink between an access point and one or more associated STAs. In some aspects, a wireless communication exchange duration may be equivalent to a duration of a remaining transmission opportunity.

The first wireless frame may be received during a contention period on the wireless network, in that the frame is not transmitted/received while a network allocation vector is set for one or more of the receiving device and the transmitting device. In some other aspects, the network allocation vector may be set when the first wireless frame is transmitted/received. For example, the device transmitting the first wireless frame may have performed a RTS/CTS exchange prior to transmitting the first wireless frame. However, one or more stations on the wireless medium may not have received the RTS/CTS exchange and thus do not have their network allocation vector set. For example, a station within proximity of the receiving device may not have its network allocation vector set, such that it may transmit at least partially concurrently with the transmission/reception of the first wireless frame. In some aspects the first wireless frame may be exchanged during (re-)association or be part of a negotiation between two devices.

In some aspects, block 605 includes determining that the received first wireless frame includes one or more errors. In some aspects, the determination that the received first wireless frame includes errors may cause the receiving device to initiate protection of a remaining portion of the wireless communication exchange as described below.

In some aspects, block 605 includes determining that the received frame contained a buffer size field in a QoS control field, such as the QOS control field 511 in FIG. 5A, indicating a non-zero value. In some aspects, this determination may cause the receiving device to initiate protection of a remaining portion of the wireless communication exchange as described below. One or more of the functions discussed above with respect to block 605 may be performed by one or more of the receiver 212 and/or processor 204.

In some aspects, block 605 includes decoding the first wireless frame to determine the transmitted device requests that the receiving device protect the wireless medium for a remaining portion of the wireless communication exchange. For example, in some aspects, the received frame may substantially conform to the format of frame 500, shown above with respect to FIG. 5A. In these aspects, a device performing process 600 may decode the more fragment field 512f to determine if a transmitting device of the frame 500 requested that the receiving device initiate protection for a data communications exchange including the frame 500. As mentioned above the field can be the Retry field, or any other field in the frame (potentially it could be in the PHY header as well).

In some aspects, block 605 includes decoding the frame to determine one or more transmission parameters.

The transmission parameters of the received frame may be located in a physical (PHY) header of the received frame. The PHY header of the received frame may include one or more of the following parameters (though not limited to) MCS, bandwidth, number of spatial streams (NS S), PPDU duration, NAV duration, a transmitter identifier, a receiver identifier, a direction of the frame (e.g., UL or DL), use of low density parity check (LDPC) or binary convolutional code (BCC), subchannel index within the bandwidth used for transmitting the payload (i.e., the (A-)MPDU), SU/MU mode, and/or Basic Service Set (BSS) color (identifier).

In some aspects, these parameters may include a request for the receiving device to initiate medium access and/or initiate protection of at least a portion of one or multiple communication exchanges as described below. Some aspects the request may include a periodicity, a number of communication exchanges to be initiated and other parameters that help the receiving device determine the duration of time for protecting the one or more communication exchanges.

In some aspects of block 605, a response to the first wireless frame, such as a third wireless frame, is transmitted. The response wireless frame may be generated to indicate that the receiving device will enable protection for a remaining portion for the wireless communication exchange. For example, in some aspects, the response frame may conform to the format shown in FIG. 5C as response frame 550. In some aspects, the protection indication field 556 may be used to indicate whether the receiving device will enable protection.

Enabling protection includes transmitting one or more messages to cause a network allocation vector (NAV) to be set, such that the wireless medium is reserved for transmissions associated with the wireless communication exchange. The indication in the response frame may be in the form of one or more bits, allocated into one or more fields of the response frame, that have particular values. The particular values may be predefined, for example, via a wireless communication standard, to provide the indication described above. For example, in some aspects, the response frame may conform to the format shown in FIG. 5C as response frame 550. In some aspects, the protection indication field 556 may be used to indicate whether the receiving device will enable protection. In some aspects, the more fragment field 512f may be set to a particular value to indicate the receiving device will enable protection as described above. Other fields may also be used for this purpose in various aspects. In received frame aspects that include transmission parameters as discussed above, the response may include confirmation of transmission parameters or provide alternative parameters, for example but not limited to a modulation and coding scheme (MCS), number of spatial streams (NSS), PPDU duration, a periodicity and number of frames that may be sent to provide protection to the device transmitting the first frame.

In some aspects, the response frame is generated to include a second indication of an estimated time when the receiving device will initiate protection of the remaining portion of the wireless communication exchange. For example, in some aspects, the second indication is a time offset from the time the response frame is transmitted, for example, as shown by start time field 558 of FIG. 5C.

In some aspects, the response frame is generated to indicate one or more transmission parameters for the transmitting device to use when retransmitting at least a portion of the first wireless frame. For example, the response frame may indicate an updated MCS, bandwidth parameters or alternative channel information, such as a suggestion to use a particular secondary channel or subchannel. An example of this is shown above with respect to transmission parameters field 560, and transmission bandwidth fields 564a-c. In some aspects, the response frame is generated to indicate a duration of time for which protection will be established. For example, in some aspects, the duration may be stored in the duration field 552.

In some aspects, the response frame is generated as an acknowledgment frame, a block acknowledgment frame, or a negative acknowledgment frame. A negative acknowledgment frame in some aspects may be indicated via an acknowledgment frame that has one or more fields in a frame control field that are set to non-zero values. For example, in one aspect, a negative acknowledgment frame is generated to have a retry field 512g of the frame control field 507 set to a value of one. In some aspects, a negative acknowledgment frame or a block acknowledgment frame is generated when block 605 determines that the received frame includes errors. For example, a block acknowledgment frame may selectively not acknowledge the received frame if it included errors. In some aspects, one or more of the functions discussed above with respect to block 605 may be performed by the transmitter 210 and/or processor 204. In some aspects, multiple response frames may be generated, one or more of which as part of a (re-) negotiation, and one or more as part of responses to received frames transmitted by the requesting devices. In some aspect no response frame may be generated. In some aspects, the transmitter may interpret the lack of a response frame as an implicit acknowledgment. In some aspects the response frame contains an HT Control field.

In block 615, a second frame is transmitted during a contention period. The second frame may be generated as a clear-to-send frame in some aspects. For example, the type/subtype field 512b/512c of the frame control field 507 may be set to values defined in the 802.11 standard that indicate the frame is a clear to send frame. The second frame may be addressed to the transmitting device, for example, via an address field 509 or 516 in a media access control header of the clear-to-send frame. The second wireless frame protects the wireless medium for a time period. For example, in some aspects, the time period is determined by the receiving device to be adequate (greater than or equal to) a time required to complete a remaining portion of the wireless communication exchange. The time period may be of a duration sufficient to protect a remaining portion of the wireless communication exchange from packet collisions.

For example, in aspects where the second wireless frame is a clear-to-send frame, a duration field (such as duration field 528) of the clear-to-send (CTS) frame may indicate a period of time during which the network allocation vector should (or shall) be set by STAs to which the CTS frame is not addressed. In these aspects, the duration field 528 may indicate a period of time during which receiver device to which the CTS frame is addressed may transmit one or more frames addressed to the transmitter of the second wireless frame. In some aspects, the device to which the CTS is addressed may transmit to any other STA during that duration of time. In some aspects the device to which the CTS is addressed should discard or otherwise ignore any previous NAV setting.

In some other aspects, the second frame may be generated as a trigger frame. For example, the trigger frame may have type/subtype values in the frame control field 507 that identify the frame as a trigger frame via an 802.11 standard (and not as a clear to send frame for example). The trigger frame may also include an indication of a time period during which the network allocation vector should be set by STAs that are not the intended receivers of the trigger frame. In some aspects, the trigger frame is generated to include a transmission schedule. The transmission schedule may indicate timing parameters associated with the transmission of one or more frames to be transmitted by the device that transmitted the first wireless frame. In some aspects, the receiving device may receive packets from multiple devices during the time period allocated for protection by the trigger frame. In some aspects, the receiving device may receive the multiple packets from multiple devices using multi-user mode, such as MU-MIMO or OFDMA. For example, as shown in FIG. 5B, the trigger frame 525 may include a series of information indicating schedule information for a particular device. For example, the device identifier field 532 indicates that information is for a particular device. Channel information field 534 indicates which channel a transmission should be performed on, and start time field 536 indicates when the transmission should begin. The fields 532, 534, 536 may be of a fixed length such that a device receiving the trigger frame 525 can parse through a number of fixed length records to see if it is identified by any of the fields 532*a-n*. In some aspects, one or more of the functions discussed above with respect to block 615 may be performed by one or more of the processor 204 and/or the transmitter 210.

In block 620, a remaining portion of the wireless communication exchange is received from the transmitting device under the protection established by the second frame. In some aspects, block 620 may include receiving one or more data packets. For example, in some aspects, if errors were detected in the first wireless frame and a negative acknowledgment was sent to the transmitting device as described above with respect to some aspects of block 605, then block 620 may include receiving a retransmission of the first wireless frame and acknowledging the retransmission. If the first wireless frame included a more data indication, then block 620 may include receiving one or more additional data frames, with one or more of these additional data frames also including a more data indication (except perhaps a last packet). The additional data frames may then be acknowledged via one or more block acknowledgments as part of block 620. The reception and/or transmission of frames in block 620 occurs under the protection from collisions provided by the NAV set as a result of functions performed during block 615. One or more of the functions discussed above with respect to block 620 may be performed by a combination of one or more of the processor 204, receiver 212, and/or transmitter 210.

Figure 7:
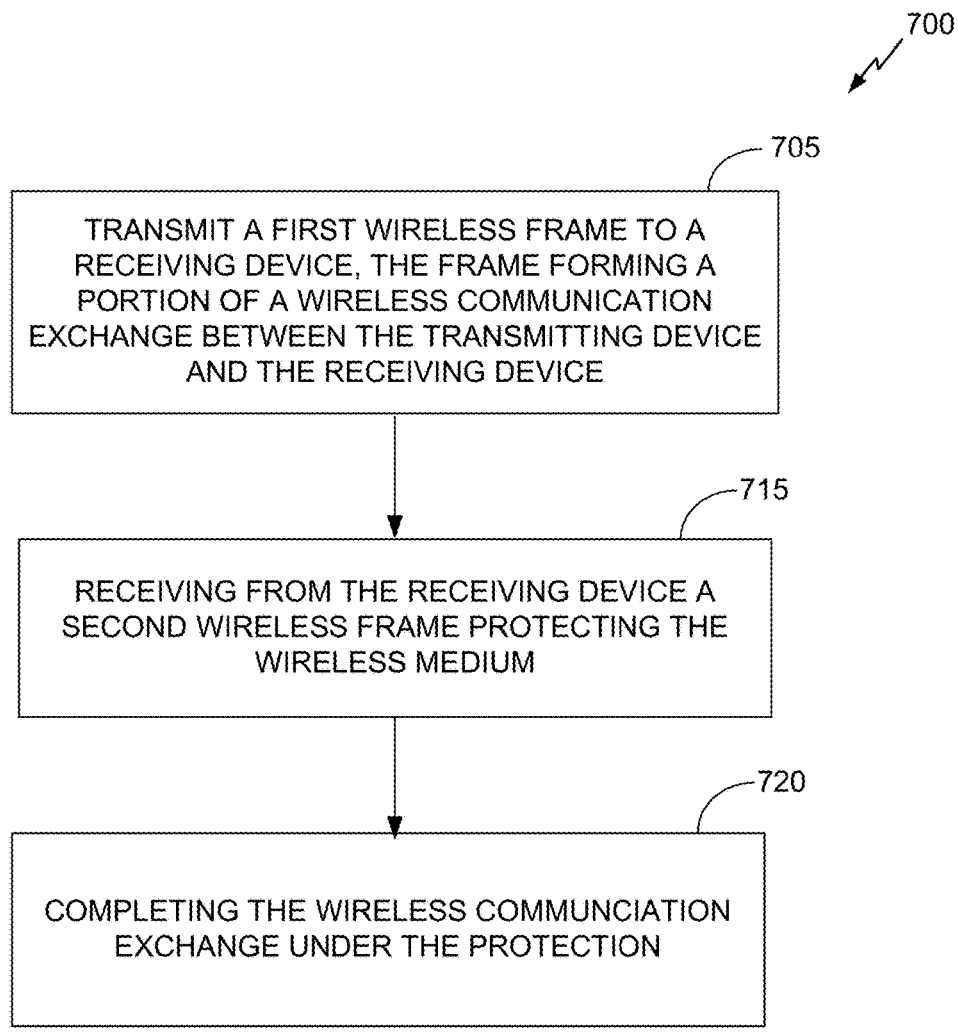
FIG. 7 is a flowchart of a method of wireless communication.

FIG. 7 is a flowchart of a method of wireless communication. In some aspects, process 700 may be performed by either a station or an access point. For example, process 700 may be performed by the STA 106*a* described with respect to FIGS. 3, 4A and 4B. In some aspects, the process 700 may be performed by the wireless device 202, described above with respect to FIG. 2. For example, in some aspects, the memory 206 may store instructions that configure the processor 204 to perform one or more of the functions discussed below with respect to process 700. In some aspects, the process 700 is performed by a device transmitting data to a receiving device, which is performing process 700.

Process 700 may allow a device transmitting data to receive an indication from a device receiving the data that the receiving device will initiate protection of data transfer from the transmitting device to the receiving device. For example, ordinarily, one or more of the frames would be transmitted during a contention period. However, using the disclosed methods and systems, the transmitting device receives an indication from the receiving device that the receiving device will initiate protection for those frames (for example, by causing a network allocation vector (NAV) to be set). This indication is received in a frame that is different than a frame actually requesting the network allocation vector (NAV) to be set.

Once the network allocation vector is set, the transmitting device resumes its transmission of frames to the receiving device. These remaining frames are transmitted under the protection from collisions provided by the NAV set by the receiving device. This protection may be especially valuable when the receiving device is within a dense network environment, where the probability of packet collisions near the receiving device is relatively high. By initiating protection of the wireless communication exchange between the transmitting device and receiving device, the receiving device can increase the likelihood of completion of the communication exchange at an acceptable packet loss/efficiency level. Note that while the description above and below generally refers to protection by setting a network allocation vector (NAV), other aspects may provide protection via any other protection mechanism. For example, some aspects may set the duration field of an L-SIG field of a frame initiating the communication exchange in order to provide protection.

In block 705, a first wireless frame is transmitted on a wireless medium. The frame is transmitted to a receiving device by a transmitting device. The first wireless frame forms at least a portion of a wireless communication exchange between the transmitting device and the receiving device. For example, in some aspects, the first wireless frame may be one of a series of data packets, which, along with corresponding acknowledgments or block acknowledgments for the one or more data packets, form a wireless communication exchange. In these aspects, some of the data packets or one or more wireless frames may include a more data indication. In some aspects, the first wireless frame does not include a more data indication. In some aspects, a wireless communication exchange may be equivalent to a duration of a remaining transmission opportunity. In some aspects, one or more of the functions discussed above with respect to block 705 may be performed by the transmitter 210 and/or the processor 204.

In some aspects, the first wireless frame is generated to include one or more transmission parameters. For example, the first wireless frame may be generated to indicate a request for a device receiving the first wireless frame to initiate medium access and/or initiate protection for at least a portion of one or more communication exchanges. In some aspects, the request may indicate a periodicity, a number of communication exchanges to be initiated by the receiving device, and other parameters that may assist the receiving device in determining a duration of time that protection should be established for one or more communication exchanges.

The transmission parameters of the first message may be located in a physical (PHY) header of the first message. The PHY header of the first message may include one or more of the following parameters (though not limited to) MCS, bandwidth, number of spatial streams (NSS), PPDU duration, NAV duration, a transmitter identifier, a receiver identifier, a direction of the frame (e.g., UL or DL), use of low density parity check (LDPC) or binary convolutional code (BCC), subchannel index within the bandwidth used for transmitting the payload (i.e., the (A-)MPDU), SU/MU mode, and/or Basic Service Set (BSS) color/identifier.

In some aspects of block 705, a response frame is received from the receiving device. The response frame may indicate the receiving device will initiate protection for a remaining portion of the wireless communication exchange. For example, in some aspects, the response frame may conform to the format of response frame 550, discussed above with respect to FIG. 5C. In some aspects, the response frame is decoded as one of an acknowledgment, block acknowledgment, or negative acknowledgment of the first wireless frame. In response to receiving a negative acknowledgment from the receiving device, the transmitting device may record or mark the first wireless frame as requiring a retransmission once the protection is established. If the first frame is acknowledged by the response frame (for example, by a block acknowledgment or a regular acknowledgment), then the first frame may be marked as completed and may not be retransmitted by the transmitting device. In some aspects, one or more of the functions discussed above with respect to block 705 may be performed by the receiver 212 and/or the processor 204.

Some aspects that receive a third wireless fame, such as a response frame as described above, may defer additional communications relating to the wireless communication exchange until the protection indicated by the response frame is established. This may include, in response to the third wireless frame, deferring further transmissions until the NAV is set. For example, if the response frame indicates an estimated time for protection to be established (for example, via start time field 558), the transmitting device may defer additional communications relating to the wireless communication exchange until at least the time indicted. In some aspects, a fixed or predetermined deferral period may be used.

In some aspects, the response frame may be decoded to determine an amount of time for which protection will be established. For example, in some aspects the duration field 552 may be decoded to determine an amount of time for which protection will be established. In some aspects, one or more transmission parameters may be decoded from the response frame. For example, in some aspects, the transmission parameters field 560 shown in FIG. 5C may be decoded. In some aspects, the transmission parameters field 560 may be at least in partial response to transmission parameters included in the first wireless frame. For example, the response frame 550 may confirm one or more of a periodicity and number of frames that may be sent by the receiving device under protection provided by the transmitting device.

The response may also be decoded to determine one or more of an updated modulation and coding scheme (MCS) (such as provided by transmission bandwidth field 564*a*), transmission bandwidth parameters (such as provided by transmission bandwidth field 564*b*) or alternative channel information (as provided by transmission bandwidth field 564*c*), such as channel allocation information or a suggestion to use a particular secondary channel may be decoded from the response frame. In some aspects, the receiving device may utilize these transmission parameters in future communications with the device transmitting the response frame.

In some aspects, multiple response frames may be received. In some aspects, one or more of these multiple response frames may be part of a renegotiation, and one or more may be part of responses to received frames transmitted by the transmitting device. In some other aspects, no response frame may be received. In these aspects, lack of a response frame may be determined to be an implicit acknowledgment.

One or more of the functions discussed above with respect to block 705 may be performed, in some aspects, by a combination of one or more of the processor 204 and/or transmitter 210.

In block 715, a second wireless frame protecting the wireless medium is received from the receiving device. In some aspects, this second wireless frame may conform with the trigger frame 525 shown in FIG. 5B. In some aspects, the second wireless frame is decoded as a clear-to-send (CTS) frame or a trigger frame. For example, in some aspects, the clear-to-send (CTS) frame may be received by the transmitting device in block 715. If the CTS frame is not addressed to the transmitting device, the CTS frame indicates a network allocation vector (NAV) should be set. In some aspects, a duration field 528 of the clear-to-send frame indicates a time period the NAV should be set. The duration field 528 may be decoded by the transmitting device to determine how long its own network allocation vector should be set. If the CTS frame is addressed to the transmitting device (i.e. the device receiving the CTS frame), the CTS is an indication that protection is now established, and a remaining portion of the pending wireless communication exchange can be completed during the protection period. A duration field 528 of the CTS frame may indicate how much time is available to complete the wireless communication exchange.

In some aspects, a trigger frame is received in block 715, indicating that protection has been established for a remaining portion of the wireless communication exchange. In some aspects, the trigger frame is decoded to determine a transmission schedule, such as transmission schedule 530 shown in FIG. 5B. The transmission schedule 530 may indicate a time when one or more frames are to be transmitted to the receiving device. For example, as shown in trigger frame 525, the transmission schedule 530 may indicate channel information 534 and/or start time information 536 for a device identified by the device id field 532. In some aspects, information for multiple devices may be present in then transmission schedule 530. The trigger frame may also include an indication of a duration of the protection for the wireless communication exchange, i.e. how long the network allocation vector (NAV) should be set by devices to which the trigger frame is not addressed.

In block 720, a remaining portion of the wireless communication exchange is completed under the protection established by the frame received in block 715. In some aspects, once protection is established, completing the wireless communication exchange may include retransmitting one or more data packets to the receiving device. In some aspects, the retransmission of the one or more data packets may be based on transmission parameters decoded from the optional response frame discussed above with respect to block 705. In some aspects, if the transmitting device previously received a negative acknowledgment for the first wireless frame transmitted in block 705, completing the wireless communication exchange may include retransmitting the first wireless frame and receiving an acknowledgment for the first wireless frame from the receiving device.

In some aspects, completing transmission of the wireless communication exchange may include transmitting one or more additional data frames including "more data" indications to the receiving device, and receiving corresponding acknowledgments, such as one or more block acknowledgments for the one or more transmitted data frames from the receiving device. In these aspects, the first wireless frame may have been generated with a more data indication as well.

In some aspects, completing transmission of the wireless communication exchange may also include transmission of one or more packets to other devices besides the receiving device. For example, in some aspects, the trigger frame discussed above may identify a time period when a transmission should be initiated to the receiving device. During the indicated time, the transmitting device may also transmit data to other devices, for example, via the use of multi-user multiple input multiple output (MU-MIMO) or orthogonal frequency division multiple access (OFDMA).

In some aspects, one or more of the functions discussed above with respect to block 720 may be performed by one or more of the processor 204 and/or transmitter 210 and/or receiver 212.

Figure 8A:
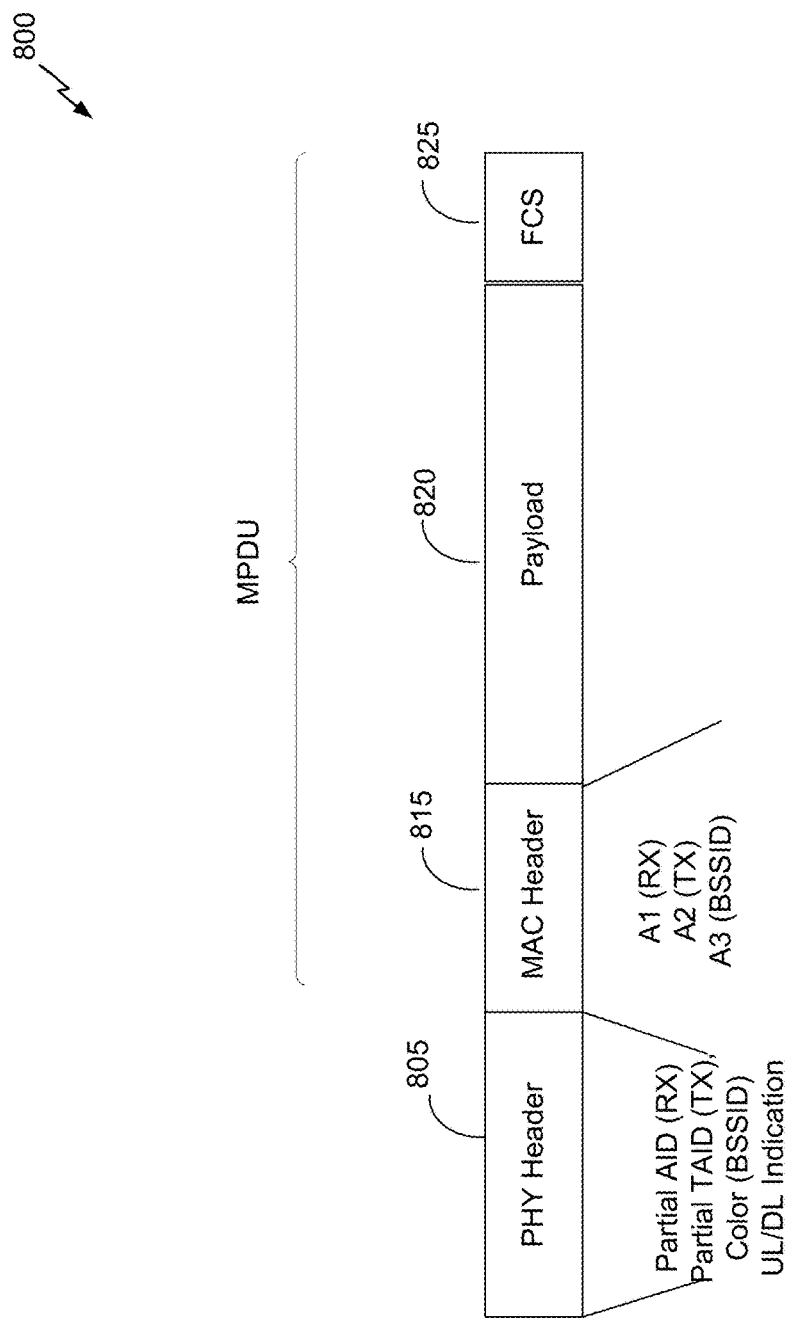
FIG. 8A shows an organization of a wireless frame.

FIG. 8A shows one organization of a wireless frame. Frame 800 includes a physical header 805, and one or more of the following: a media access control (MAC) header 815, payload 820, and a frame check sequence (FCS) field 825, and padding (not shown). The frame 800 includes a variety of data that may be used to determine whether the frame is addressed to a particular device that may receive the frame. For example, in some aspects the physical header 805 may contain one or more of a partial association identifier for the addressed (intended) receiving device, a partial association identifier for the device transmitting the frame, a basic service set color indication, typically a basic service set identifier of a device transmitting the frame, and/or an indication of whether the frame is UL or DL.

The media access control (MAC) header 815 may also include one or more indications of an intended receiver of the frame. For example, the media access control header 815 may include an address field (A1) indicating a station address or other identifier of the intended receiver device (i.e. the device to which the frame is "addressed"). The MAC header 815 may also include an address field indicating a station address or other identifier of the transmitting device. The MAC header 815 may also include an address field indicating the basic service set identifier of the transmitting device. One or more of these fields in the frame 800 may be used to determine an intended receiver of the frame 800 in the event that the frame 800 becomes partially corrupt due to, for example, a collision with another frame on a wireless medium. An example of such a process is described below with respect to FIG. 9.

Figure 8B:
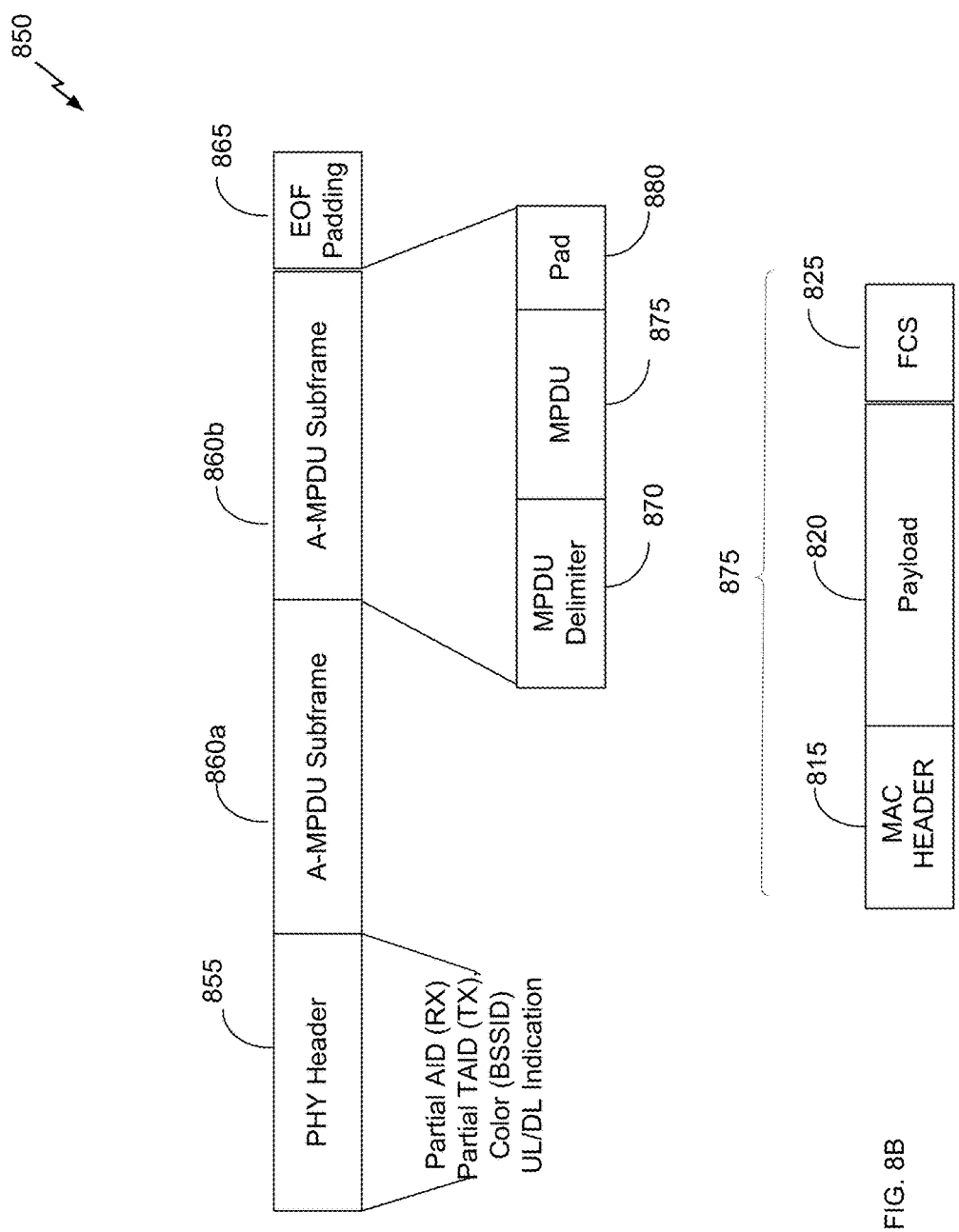
FIG. 8B shows another organization of a wireless frame.

FIG. 8B shows another organization of a wireless frame 850. The frame 850 includes a physical header 855, a plurality of A-MPDU subframes, shown in the example of FIG. 8B as A-MPDU subframe 860a and A-MPDU subframe 860b, and optional padding 865. Each of the A-MPDU subframes included in frame 850 may include an MPDU delimiter field 870, an MPDU 875 (including a MAC header, payload, and frame check sequence field, which are not shown in FIG. 8B), and an optional pad field 880.

The frame 850 includes a variety of data that may be used to determine whether the frame is addressed to a particular device that may receive the frame. For example, in some aspects the physical header 855 may contain one or more of a partial association identifier for the addressed (intended) receiving device, a partial association identifier for the device transmitting the frame, and a basic service set color indication, typically a basic service set identifier of a device transmitting the frame, an indication whether the frame is UL or DL.

Each of the media access control (MAC) headers 815 in the frame 850 may also include one or more indications of an intended receiver of the frame. For example, the media access control header 815 may include an address field (A1) indicating a station address or other identifier of the intended receiver device (i.e. the device to which the frame is "addressed"). The MAC header 815 may also include an address field indicating a station address or other identifier of the transmitting device. The MAC header 815 may also include an address field indicating the basic service set identifier of the transmitting device. One or more of these fields in the frame 850 may be used to determine an intended receiver of the frame 800 in the event that the frame 850 becomes partially corrupt due to, for example, a collision with another frame on a wireless medium. An example of such a process is described below with respect to process 900.

Figure 9:
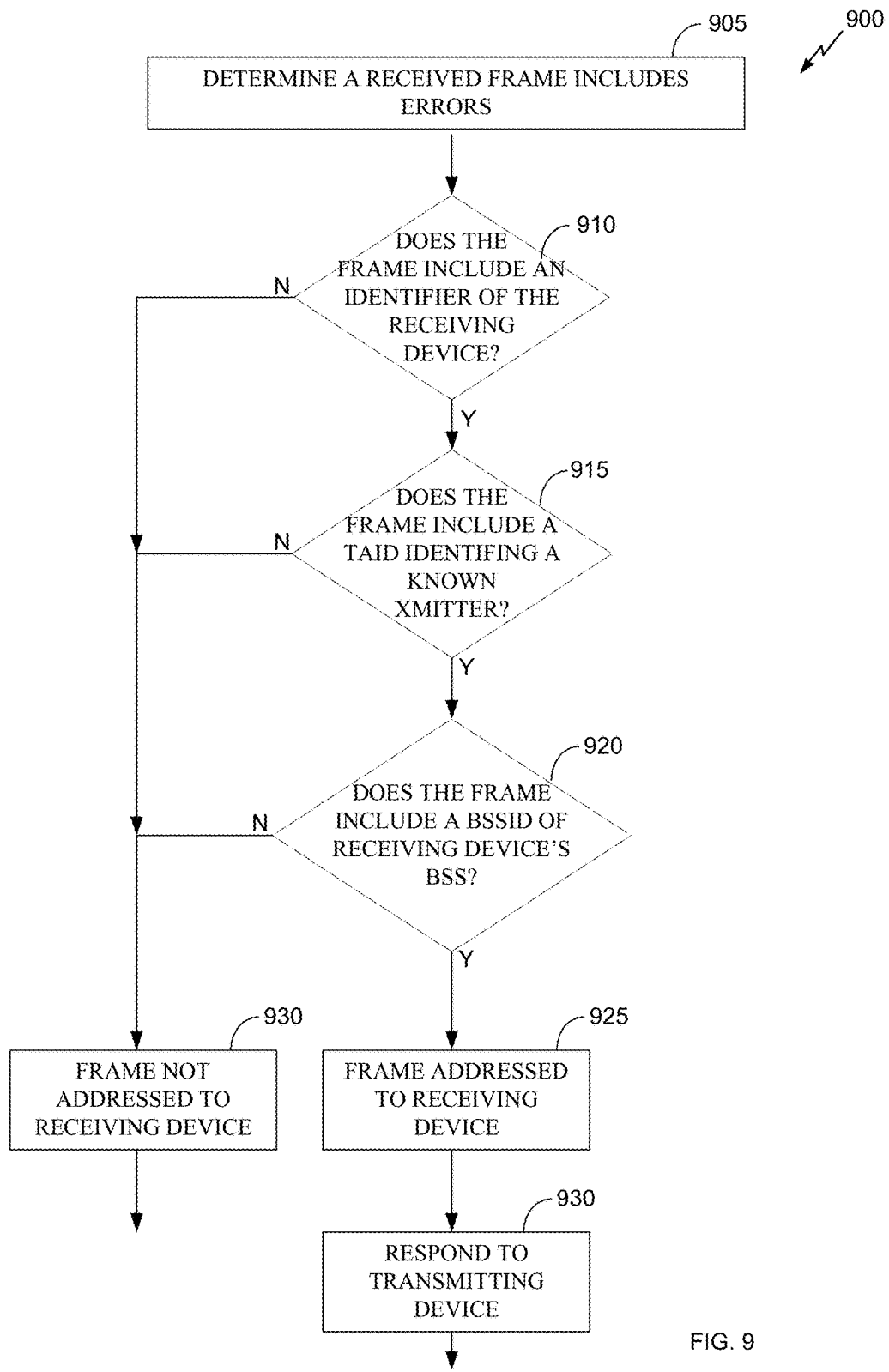
FIG. 9 is a flowchart of a method of determining whether a frame that includes errors is addressed to a device receiving the frame.

FIG. 9 is a flowchart of a method of determining whether a frame that includes errors is addressed to a device receiving the frame. For example, although errors caused by packet collisions may corrupt at least portions of a received frame, other portions of the frame may remain uncorrupted. By decoding the uncorrupted portions of the frame, a device receiving the frame may be able to determine whether the corrupted frame was addressed to the receiving device or not. This information may be used to determine whether the receiving device should initiate protection for a communication exchange between itself and a device transmitting the corrupted frame, as discussed above.

In some aspects, process 900 may be performed by any of the wireless device 202 of FIG. 2, AP 104 or STA 106a-b of FIGS. 1, and 3-4A-B. For example, in some aspects, each of the blocks discussed below may be performed by the processor 204. In some aspects, the frame discussed below may substantially conform with one or more of the characteristics of the frame 800 or frame 850, discussed above with respect to FIGS. 8A-B.

In block 905, a frame received by a receiving device may be determined to include one or more errors. For example, in some aspects, a frame check sequence field, such as any one of frame check sequence field 513, 535, 562, or 825 of FIGS. 5A-C or FIGS. 8A-B, respectively may be used to verify the integrity of the received frame as is known in the art. This integrity check may determine that the received frame includes at least one error. The frame received in block 905 may be transmitted by a transmitting device, which may be an access point or a station in various aspects.

Decision block 910 determines whether the frame includes an identifier identifying the receiving device. In some aspects the identifier may be at least a portion of an association identifier, such as a partial association identifier. For example, the partial association identifier of the receiving device, as illustrated in FIGS. 8A-B, may be included in a physical header 805 or 855 of the frames 800 and 850 respectively. The receiving device may determine whether a partial association identifier (AID) or (PAID) included in the frame is at least a partial match to an AID assigned to the receiving device during a previous association with an access point. In some aspects the (partial) AID included in the frame is at least a partial match to a MAC address of the receiving device.

In some aspects, a partial match may require one or more bits of the (partial) AID in the frame to match corresponding bits in an AID previously assigned to the receiving device. In some aspects, all bits of the partial AID of the frame must match a previously assigned AID in order for a match to be determined in decision block 910. In other aspects, fewer than all the bits may be required to match. For example, 4, 5, 6, 7, 8, 9, 10, 11, 12, 13, 14, 15, or 16 bits of the (partial) AID in the frame must match a previously assigned AID for a match to be determined in decision block 910.

Functions performed in block 910 may vary across embodiments. For example, in some aspects, the identifier referenced in block 910 may actually be comprised of at least portions of multiple fields included in the received frame. For example, in some aspects, a PHY header of the received frame may not have the identifier of the receiving device as discussed with respect to block 910. In some aspects, the received frame may include a transmitter association identifier (e.g. partial or full association identifier) field and/or a basic service set color field, and/or an uplink/downlink indication. In some aspects, the receiving device may determine the received frame is intended for or addressed to the receiving device based on a combination of one or more of these fields.

If the frame does not include at least a partial match with a previously assigned AID, process 900 moves to block 930, which determines the frame is not addressed to the receiving device. Otherwise, in some aspects, decision block 910 may also inspect one or more media access control headers included in the frame to determine whether an address field identifies the receiving device. For example, as illustrated in frame 800 of FIG. 8A, the media access control header 815 may include an address field (A1) that identifies an intended receiver of the frame. If this identifier identifies the receiving device (i.e. the device performing process 900), then decision block 910 may determine a match has occurred. If no correctly received MAC header address field (such as an address field 509 of FIG. 5A, 516 of FIG. 5B, or the A1 field shown in MAC header 815 identifies the receiving device, process 900 moves to block 930, which determines the frame is not addressed to the receiving device.

Otherwise, process 900 moves to decision block 915, which determines whether the frame includes identification of a device transmitting the frame, and whether that device is a "known" transmitting device. A known transmitting device may be a device that the receiving device (i.e. the device performing process 900) has previously exchanged frames with. For example, any device with which the receiving device is associated would be a known transmitting device.

In some aspects the transmitter identifier may be at least a portion of an association identifier or at least a portion of a MAC address of a known transmitting device. For example, the device performing process 900 may maintain a data store of association identifiers and/or MAC addresses of devices it has previous communicated with. If a transmitter's association identifier (e.g. partial or full association identifier) (TAID) value included in the received frame (such as the partial TAID shown in the physical header 805 of frame 800 of FIG. 8A) does not at least partially match a known transmitting device, process 900 moves from decision block 915 to block 930, which determines the received frame is not addressed to the receiving device. Otherwise, if the TAID of the received frame is at least a partial (or complete) match with a known transmitting device, then some aspects of process 900 may also inspect a media access control (MAC) header included in the frame to determine whether an address field, such as an A2 field (such as second address field 510 shown in FIG. 5A) identifies a known transmitting device. If no correctly received MAC header address field (such as the second address field 510) identifies a known transmitting device in these aspects, process 900 moves from decision block 915 to block 930, which determines the received frame is not addressed to the receiving device. Otherwise, process 900 moves to decision block 920.

Decision block 920 determines whether the frame includes a basic service set identifier which is equivalent to at least a portion of the receiving device's basic service set identifier. If it does not, process 900 moves to block 930, which determines the received frame is not addressed to the receiving device. If the frame does include at least a portion of the basic service set (BSS) identifier of the receiving device, process 900 moves to block 925, which determines the frame is addressed to the receiving device. In some aspects the basic service set (BSS) identifier is included in the physical (PHY) header, such as a physical layer convergence protocol (PLCP) header. Some aspects of block 925 may infer one or more additional values from the frame. For example, a transmission opportunity (TXOP) duration specified in the PHY header, for example in an L-SIG, SIG-A/B/C field, a length of a PHY Service Data Unit (PSDU) as specified in the PHY header, for example in the L-SIG, SIG-A/B/C field, a modulation and coding scheme (MCS), and other parameters useful for future scheduling of the protected TXOP may be inferred from the received frame's PHY header or other portions of the frame.

Some aspects of process 900 further include block 930, which responds to the transmitting device based on the received frame being addressed to the receiving device. For example, in some aspects, block 930 may include one or more functions of process 600, discussed above with respect to FIG. 6. For example, in some aspects, the received frame of block 905 may be the same frame as the first wireless frame referenced in block 605.

While process 900 shown in FIG. 9 and described above provides at least one example implementation, other implementations of determining whether a frame that includes errors is addressed to a device receiving the frame are also contemplated. For example, in some aspects, an access point may be able to determine whether a frame is addressed to it in a different manner than a station. For example, in some aspects, if an access point can successfully decode that the received frame is an uplink frame (for example, via an uplink/downlink indicator in the frame), and a basic service set color indication in the frame is a match for the access point's color, then the access point may determine the frame is addressed to it. In some aspects, the access point may decode an association identifier (e.g. partial or full association identifier) of the transmitter of the received frame from the received frame. If the decoded association identifier field corresponds to records of association identifiers the access point has used to communicate with an associated station, then this determination may contribute to a determination that the received frame was intended for or addressed to the access point. In some aspects, the access point may decode a receiver association identifier field (e.g. partial or full association identifier) from the received frame. If the value in this field matches an association identifier of the access point, the association identifier field may contribute to a determination that the received frame is intended for or addressed to the access point.

A station may determine a received frame is intended for or addressed to it using some of the same fields used by an access point but may also utilize different fields. For example, in some aspects, a station may determine whether a partial association identifier of an intended receiver, and a BSS color field (identifier of the basic service set), of a downlink frame indicates the frame is addressed to the station. For example, if the association identifier (e.g. partial or full association identifier) of the receiver field corresponds to the station's partial association identifier, and the BSS color field of the received frame matches a BSS color of an associated access point, the station may determine the received frame is addressed to it. In some other aspects, a station may rely only on BSS color indication in a downlink frame. In some aspects, the station may also decode a transmitter address of the received frame, if it is not corrupted. The station may determine whether the transmitter address corresponds to a device (e.g. access point) with which the station is associated. If it does, this may further confirm that the received frame was intended for or addressed to the station.

In some of the above aspects, the station may decode an association identifier of the transmitter (e.g. partial or full association identifier) in the received frame. If the decoded transmitter partial association identifier field corresponds to records of partial association identifier of transmitters the station has used to communicate with an associated access point, then this determination may contribute to a determination that the received frame was intended for or addressed to the station.

In some aspects, process 900 may include transmitting a clear-to-send frame or a trigger frame. In some aspects, the clear-to-send or trigger frame may be addressed to the receiving device (in that a destination address field identifies the receiving device). By transmitting the clear-to-send frame or the trigger frame, the receiving device may signal to the transmitting device that it should allocate resources for transmission of frames, including a retransmission of the frame received in block 905, to the receiving device.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-e, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, the functional means may include a processor and memory operably coupled to the processor, the memory storing instructions that configure to the processor to perform the described functions.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a data communications medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of data communications medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication on a wireless medium, comprising:
   receiving, by a receiving device, a first wireless frame, from a transmitting device, during a contention period, the first wireless frame forming a portion of a wireless communication exchange between the transmitting device and the receiving device, the first wireless frame being generated to include one or more transmission parameters in a physical (PHY) header of the first wireless frame;
   determining, by the receiving device, that the first wireless frame includes an error;
   in response to the receiving device determining that the first wireless frame includes the error, transmitting, by the receiving device, during the contention period, and based on the one or more transmission parameters included in the PHY header of the first wireless frame, a second wireless frame indicating that a network allocation vector for the wireless medium should be set for a time period of a duration sufficient to protect a remaining portion of the wireless communication exchange between the transmitting device and the receiving device from packet collisions; and
   receiving, via the receiving device, the remaining portion of the wireless communication exchange, from the transmitting device, during the time period.

2. The method of claim 1, wherein the wireless communication exchange includes one or more wireless frames with a more data indication, and corresponding acknowledgments for the one or more wireless frames.

3. The method of claim 1, further comprising transmitting to the transmitting device, in response to the first wireless frame, a third wireless frame indicating that the receiving device will protect the wireless medium for the remaining portion of the wireless communication exchange.

4. The method of claim 1, further comprising decoding the first wireless frame to determine the transmitting device requests that the receiving device protect the wireless medium for the remaining portion of the wireless communication exchange; and transmitting the second wireless frame in response to the determination.

5. The method of claim 3, further comprising generating the third wireless frame to indicate a time when the receiving device will protect the wireless medium.

6. The method of claim 3, further comprising generating the third wireless frame to indicate one or more of the one or more transmission parameters for the transmitting device, wherein the one or more transmission parameters include at least a transmitter identifier for the transmitting device.

7. The method of claim 6, wherein the one or more transmission parameters include one or more of a modulation and coding scheme, a transmission bandwidth, channel information, or a channel allocation for the transmission of the remaining portion of the wireless communication exchange.

8. An apparatus for wireless communication on a wireless medium, comprising:
   a receiver configured to receive a first wireless frame, from a transmitting device, during a contention period, the first wireless frame forming a portion of a wireless communication exchange between the transmitting device and the receiving device, the first wireless frame being generated to include one or more transmission parameters in a physical (PHY) header of the first wireless frame;
   a processor configured to determine that the first wireless frame includes an error; and
   a transmitter configured to, in response to the processor determining that the first wireless frame includes the error, transmit during the contention period, and based on the one or more transmission parameters included in the PHY header of the first wireless frame, a second wireless frame indicating that a network allocation vector for the wireless medium is set for a time period of a duration sufficient to protect a remaining portion of the wireless communication exchange between the transmitting device and the receiving device from packet collisions; and
   completing the wireless communication exchange during the time period.

9. The apparatus of claim 8, wherein the wireless communication exchange includes one or more wireless frames with a more data indication, and corresponding acknowledgments for the one or more wireless frames.

10. The apparatus of claim 8, further comprising transmitting to the transmitting device, in response to the first wireless frame, a third wireless frame indicating that the apparatus will transmit the second wireless frame.

11. The apparatus of claim 8, wherein the processor is further configured to decode the first wireless frame to determine the transmitting device requests that the apparatus set the network allocation vector for the time period for the duration sufficient to protect the remaining portion of the wireless communication exchange from packet collisions.

12. The apparatus of claim 10, wherein the processor is further configured to generate the third wireless frame to indicate one or more of the one or more transmission parameters for the transmitting device, and wherein the one or more transmission parameters include at least a transmitter identifier for the transmitting device, and wherein the one or more transmission parameters include one or more of a modulation and coding scheme, a transmission bandwidth, channel information, and a channel allocation.

13. The apparatus of claim 10, wherein the processor is further configured to generate the third wireless frame as one of a block acknowledgment or a negative acknowledgment.

14. The apparatus of claim 10, wherein the processor is further configured to generate the third wireless frame to indicate a time when the apparatus will transmit the second wireless frame.

15. The apparatus of claim 10, wherein the processor is further configured to generate the third wireless frame to indicate one or more transmission parameters.

16. The apparatus of claim 10, wherein the processor is further configured to generate the third wireless frame to indicate a duration of time for which the network allocation vector will be set.

17. The apparatus of claim 8, wherein the processor is further configured to determine a time necessary to complete the wireless communication exchange, and generate the second wireless frame to protect the wireless medium for at least the time necessary.

18. The apparatus of claim 8, wherein the transmitter is further configured to transmit the second wireless frame protecting the wireless medium by transmitting a clear-to-send frame to the transmitting device, the clear-to-send frame indicating a duration greater than or equal to a time necessary to transmit the remaining portion.

19. A method of wireless communication over a wireless medium, comprising:
   generating, by a transmitting device, a first wireless frame to include one or more transmission parameters in a physical (PHY) header of the first wireless frame;
   transmitting, by the transmitting device, the first wireless frame, to a receiving device, during a contention period, the first wireless frame comprising a portion of a wireless communication exchange between the transmitting device and the receiving device;
   receiving, in response to a determination that the first wireless frame includes the error, and based on the one or more transmission parameters included in the PHY header of the first wireless frame, a second wireless frame from the receiving device, the second wireless frame indicating that a network allocation vector should be set for a time period; and
   completing, by the transmitting device, the wireless communication exchange with the receiving device during the time period.

20. The method of claim 19, further comprising generating the first wireless frame to comprise an indication of a request for the receiving device to set the network allocation vector.

21. The method of claim 19, further comprising:
   receiving, from the receiving device, a third wireless frame different than the second wireless frame, the third wireless frame comprising an indication that the receiving device will request the network allocation vector be set; and
   in response to the third wireless frame, deferring further transmissions of the wireless communication exchange until the network allocation vector is set.

22. The method of claim 21, further comprising decoding the third wireless frame to determine one or more of a confirmation of the one or more transmission parameters included in the first wireless frame, and one or more of the one or more transmission parameters for transmission to the receiving device, wherein the one or more transmission parameters include at least a transmitter identifier for the transmitting device.

23. The method of claim 19, further comprising: generating the first wireless frame as a data frame with a more data indication, wherein completing transmission of the wireless communication exchange comprises transmitting one or more additional data frames and receiving corresponding acknowledgments for the one or more additional data frames.

24. An apparatus for wireless communication over a wireless medium, comprising:
   a processor configured to generate a first wireless frame to include one or more transmission parameters in a physical (PHY) header of the first wireless frame;
   a transmitter configured to transmit the first wireless frame to a receiving device during a contention period, the first wireless frame comprising a portion of a wireless communication exchange between the apparatus and the receiving device;
   a receiver configured to receive, in response to a determination that the first wireless frame includes the error, and based on the one or more transmission parameters included in the PHY header of the first wireless frame, a second wireless frame indicating that a network allocation vector should be set for a time period; and
   completing the wireless communication exchange with the receiving device during the time period.

25. The apparatus of claim 24, wherein the processor is further configured to generate the first wireless frame to comprise an indication of a request for the receiving device to set the network allocation vector.

26. The apparatus of claim 24, wherein the receiver is further configured to receive a third wireless frame comprising an indication that the receiving device will set the network allocation vector, and the processor is further configured to, in response to the third wireless frame, defer further transmissions of the wireless communication exchange until the network allocation vector is set.

27. The apparatus of claim 26, wherein the processor is further configured to decode the third wireless frame to determine one or more of a confirmation of the one or more transmission parameters included in the first wireless frame, and one or more of the one or more transmission parameters for transmission to the receiving device, wherein the one or more transmission parameters include at least a transmitter identifier for the transmitting device.

28. The apparatus of claim 24, wherein the processor is further configured to generate the first wireless frame as a data frame with a more data indication, and wherein completing transmission of the wireless communication exchange comprises transmitting one or more additional data frames and receiving corresponding acknowledgments for the transmitted data frames.

* * * * *